(12) United States Patent
Vadala et al.

(10) Patent No.: US 12,282,564 B2
(45) Date of Patent: Apr. 22, 2025

(54) SYSTEMS AND METHODS FOR ASSESSMENT OF CYBER RESILIENCE

(71) Applicant: BitSight Technologies, Inc., Boston, MA (US)

(72) Inventors: Derek Vadala, Wading River, NY (US); Sean Malone, Lynnwood, WA (US); John Freund, Huntersville, NC (US); Vincent Dasta, Grayslake, IL (US); Joan Roserie, Charlotte, NC (US)

(73) Assignee: BitSight Technologies, Inc., Boston, MA (US)

( * ) Notice: Subject to any disclaimer, the term of this patent is extended or adjusted under 35 U.S.C. 154(b) by 106 days.

(21) Appl. No.: 18/162,154

(22) Filed: Jan. 31, 2023

(65) Prior Publication Data

US 2023/0244794 A1      Aug. 3, 2023

Related U.S. Application Data

(60) Provisional application No. 63/305,082, filed on Jan. 31, 2022.

(51) Int. Cl.
| | |
|---|---|
| G06F 21/57 | (2013.01) |
| G06F 30/20 | (2020.01) |
| G06F 111/08 | (2020.01) |

(52) U.S. Cl.
CPC ............ G06F 21/577 (2013.01); G06F 30/20 (2020.01); *G06F 2111/08* (2020.01); *G06F 2221/034* (2013.01)

(58) Field of Classification Search
CPC .... G06F 21/577; G06F 30/20; G06F 2111/08; G06F 2221/034
See application file for complete search history.

(56) References Cited

U.S. PATENT DOCUMENTS

| | | |
|---|---|---|
| 5,867,799 A | 2/1999 | Lang et al. |
| 6,016,475 A | 1/2000 | Miller et al. |
| (Continued) | | |

FOREIGN PATENT DOCUMENTS

| | | |
|---|---|---|
| WO | WO-2017/142694 A1 | 1/2019 |
| WO | WO-2019/023045 A1 | 1/2019 |

OTHER PUBLICATIONS

U.S. Appl. No. 15/271,655 Published as: US 2018/0083999, Self-Published Security Risk Management, filed Sep. 21, 2016.

(Continued)

*Primary Examiner* — Normin Abedin
(74) *Attorney, Agent, or Firm* — Goodwin Procter LLP

(57) ABSTRACT

Systems and methods are disclosed for providing a cyber resilience rating. A method can include obtaining a plurality of entity indicators. The method can include determining a peer group of entities for the entity based on the entity indicators. The method can include obtaining a plurality of loss event records for the peer group. The method can include executing, based on the loss event records, a plurality of Monte Carlo simulations to generate loss simulation data. The method can include identifying, based on the loss simulation data, an expected probability value. The method can include providing a risk factor score indicative of a cyber security risk of the entity based on the identified expected probability value. The method can include providing a cyber resilience rating for the entity based on a combination of the risk factor score, a fortitude factor score, and a governance factor score.

20 Claims, 5 Drawing Sheets

(56) References Cited

U.S. PATENT DOCUMENTS

| | | |
|---|---|---|
| 6,578,066 B1 | 6/2003 | Logan et al. |
| 6,745,150 B1 | 6/2004 | Breiman |
| 6,785,732 B1 | 8/2004 | Bates et al. |
| 6,792,401 B1 | 9/2004 | Nigro et al. |
| 7,062,572 B1 | 6/2006 | Hampton |
| D525,264 S | 7/2006 | Chotai et al. |
| D525,629 S | 7/2006 | Chotai et al. |
| 7,100,195 B1 | 8/2006 | Underwood |
| 7,124,055 B2 | 10/2006 | Breiman |
| 7,194,769 B2 | 3/2007 | Lippmann et al. |
| 7,257,630 B2 | 8/2007 | Cole et al. |
| 7,290,275 B2 | 10/2007 | Baudoin et al. |
| 7,343,626 B1 | 3/2008 | Gallagher |
| 7,389,262 B1 | 6/2008 | Lange |
| 7,409,357 B2 | 8/2008 | Schaf et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |
| D630,645 S | 1/2011 | Tokunaga et al. |
| 7,971,252 B2 | 6/2011 | Lippmann et al. |
| 8,000,698 B2 | 8/2011 | Wolman et al. |
| 8,042,184 B1 | 10/2011 | Batenin |
| 8,056,132 B1 | 11/2011 | Chang et al. |
| D652,048 S | 1/2012 | Joseph |
| 8,150,538 B2 | 4/2012 | Dubinsky |
| 8,239,939 B2 | 8/2012 | Dunagan et al. |
| D667,022 S | 9/2012 | LoBosco et al. |
| 8,266,695 B1 | 9/2012 | Clay, IV |
| 8,321,791 B2 | 11/2012 | Dixon et al. |
| 8,359,651 B1 | 1/2013 | Wu et al. |
| 8,370,933 B1 | 2/2013 | Buckler |
| 8,370,938 B1 | 2/2013 | Daswani et al. |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| 8,505,094 B1 | 8/2013 | Xuewen et al. |
| D691,164 S | 10/2013 | Lim et al. |
| D694,252 S | 11/2013 | Helm |
| D694,253 S | 11/2013 | Helm |
| 8,578,496 B1 | 11/2013 | Krishnappa |
| 8,578,499 B1 | 11/2013 | Zhu et al. |
| 8,584,233 B1 | 11/2013 | Yang et al. |
| D696,677 S | 12/2013 | Corcoran et al. |
| 8,601,575 B2 | 12/2013 | Mullarkey et al. |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,683,584 B1 | 3/2014 | Daswani et al. |
| 8,752,183 B1 | 6/2014 | Heiderich et al. |
| 8,775,402 B2 | 7/2014 | Baskerville et al. |
| 8,776,240 B1 | 7/2014 | Wu et al. |
| 8,806,646 B1 | 8/2014 | Daswani et al. |
| 8,825,662 B1 | 9/2014 | Kingman et al. |
| 8,839,432 B1 | 9/2014 | Patil |
| 8,850,570 B1 | 9/2014 | Ramzan |
| 8,898,776 B2 | 11/2014 | Molnar et al. |
| D719,969 S | 12/2014 | Ebtekar et al. |
| 8,949,988 B2 | 2/2015 | Adams et al. |
| 8,949,990 B1 | 2/2015 | Hsieh et al. |
| 8,966,639 B1 | 2/2015 | Roytman et al. |
| D727,942 S | 4/2015 | Angelides |
| 9,015,263 B2 | 4/2015 | Styler et al. |
| D730,918 S | 6/2015 | Park et al. |
| 9,049,222 B1 | 6/2015 | He et al. |
| 9,053,210 B2 | 6/2015 | Elnikety et al. |
| 9,075,990 B1 | 7/2015 | Yang |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| 9,323,930 B1 | 4/2016 | Satish |
| D756,371 S | 5/2016 | Bertnick et al. |
| D756,372 S | 5/2016 | Bertnick et al. |
| D756,392 S | 5/2016 | Yun et al. |
| D757,070 S | 5/2016 | Dziuba |
| D759,073 S | 6/2016 | Winklevoss |
| D759,084 S | 6/2016 | Yampolskiy et al. |
| D759,689 S | 6/2016 | Olson et al. |
| 9,372,994 B1 | 6/2016 | Yampolskiy et al. |
| 9,373,144 B1 | 6/2016 | Ng et al. |
| D760,782 S | 7/2016 | Kendler et al. |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,413,774 B1 | 8/2016 | Liu et al. |
| 9,420,049 B1 | 8/2016 | Talmor et al. |
| 9,424,333 B1 | 8/2016 | Bisignani et al. |
| 9,432,383 B2 | 8/2016 | Johns et al. |
| D766,952 S | 9/2016 | Gedrich et al. |
| 9,438,615 B2 | 9/2016 | Gladstone et al. |
| 9,479,526 B1 | 10/2016 | Yang |
| D771,103 S | 11/2016 | Eder |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D774,068 S | 12/2016 | Derby et al. |
| 9,530,016 B1 | 12/2016 | Pomerantz |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,548,988 B1 | 1/2017 | Roundy et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| 9,578,048 B1 | 2/2017 | Hunt et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| 9,680,855 B2 | 6/2017 | Schultz et al. |
| 9,680,858 B1 | 6/2017 | Boyer et al. |
| D791,153 S | 7/2017 | Rice et al. |
| D791,166 S | 7/2017 | Sandhu et al. |
| D791,834 S | 7/2017 | Eze et al. |
| D792,427 S | 7/2017 | Weaver et al. |
| D794,666 S | 8/2017 | Havaldar et al. |
| D794,667 S | 8/2017 | Havaldar et al. |
| D795,891 S | 8/2017 | Kohan et al. |
| 9,736,019 B2 | 8/2017 | Hardison et al. |
| 9,742,796 B1 | 8/2017 | Salsamendi |
| 9,749,336 B1 | 8/2017 | Zhang et al. |
| D796,523 S | 9/2017 | Bhandari et al. |
| D797,138 S | 9/2017 | Reiter et al. |
| D801,989 S | 11/2017 | Iketsuki et al. |
| D803,237 S | 11/2017 | Wu et al. |
| 9,813,440 B1 | 11/2017 | Hoover et al. |
| 9,825,976 B1 | 11/2017 | Gomez et al. |
| 9,825,984 B1 | 11/2017 | Hoover et al. |
| D804,528 S | 12/2017 | Martin et al. |
| D806,735 S | 1/2018 | Olsen et al. |
| D806,737 S | 1/2018 | Chung et al. |
| D807,379 S | 1/2018 | Pahwa et al. |
| 9,880,710 B1 | 1/2018 | Mackinlay et al. |

(56) References Cited

U.S. PATENT DOCUMENTS

| | | |
|---|---|---|
| D809,523 S | 2/2018 | Lipka et al. |
| D809,989 S | 2/2018 | Lee et al. |
| D810,100 S | 2/2018 | Govindan Sankar Selvan et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D818,475 S | 5/2018 | Yepez et al. |
| 9,973,524 B2 | 5/2018 | Boyer et al. |
| D819,687 S | 6/2018 | Yampolskiy et al. |
| D824,954 S | 8/2018 | Parfentieva et al. |
| 10,044,750 B2 | 8/2018 | Livshits et al. |
| D829,239 S | 9/2018 | Rehman |
| 10,079,854 B1 | 9/2018 | Scott et al. |
| 10,084,817 B2 | 9/2018 | Saher et al. |
| 10,142,364 B2 | 11/2018 | Baukes et al. |
| D835,631 S | 12/2018 | Yepez et al. |
| 10,180,966 B1 | 1/2019 | Lang et al. |
| 10,185,924 B1 | 1/2019 | McClintock et al. |
| 10,210,329 B1 | 2/2019 | Malik et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| 10,242,180 B2 | 3/2019 | Haefner et al. |
| D847,147 S | 4/2019 | Wesley et al. |
| D847,169 S | 4/2019 | Sombreireiro et al. |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| D853,413 S | 7/2019 | Hofner et al. |
| 10,339,321 B2 | 7/2019 | Tedeschi |
| 10,339,484 B2 | 7/2019 | Pai et al. |
| 10,348,755 B1 | 7/2019 | Shavell et al. |
| 10,412,083 B2 | 9/2019 | Zou et al. |
| D863,335 S | 10/2019 | Hardy et al. |
| D863,345 S | 10/2019 | Hardy et al. |
| D864,219 S | 10/2019 | Farnan et al. |
| 10,453,142 B2 | 10/2019 | Mun |
| 10,469,515 B2 | 11/2019 | Helmsen et al. |
| 10,482,239 B1 | 11/2019 | Liu et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D872,574 S | 1/2020 | Deylamian et al. |
| 10,540,374 B2 | 1/2020 | Singh et al. |
| D874,506 S | 2/2020 | Kang et al. |
| 10,558,546 B2 | 2/2020 | Cranfill et al. |
| 10,572,945 B1 | 2/2020 | McNair |
| D880,512 S | 4/2020 | Greenwald et al. |
| D894,939 S | 9/2020 | Braica |
| 10,764,298 B1 | 9/2020 | Light et al. |
| 10,776,483 B2 | 9/2020 | Bagulho Monteiro Pereira |
| D900,145 S | 10/2020 | Malahy et al. |
| 10,796,260 B2 | 10/2020 | Brannon et al. |
| 10,805,331 B2 | 10/2020 | Boyer et al. |
| D903,693 S | 12/2020 | Li et al. |
| D905,712 S | 12/2020 | Li et al. |
| D905,730 S | 12/2020 | Newsom |
| D908,139 S | 1/2021 | Hardy et al. |
| 10,896,394 B2 | 1/2021 | Brannon et al. |
| D910,705 S | 2/2021 | Capela et al. |
| 10,909,488 B2 | 2/2021 | Hecht et al. |
| D914,719 S | 3/2021 | Ryan et al. |
| D914,732 S | 3/2021 | Fischbach |
| D918,955 S | 5/2021 | Madden, Jr. et al. |
| D920,343 S | 5/2021 | Bowland |
| D920,353 S | 5/2021 | Boutros et al. |
| D921,031 S | 6/2021 | Tessier et al. |
| D921,662 S | 6/2021 | Giannino et al. |
| D921,674 S | 6/2021 | Kmak et al. |
| D921,677 S | 6/2021 | Kmak et al. |
| D922,397 S | 6/2021 | Modi et al. |
| D924,901 S | 7/2021 | Garg et al. |
| D924,909 S | 7/2021 | Nasu et al. |
| D931,867 S | 9/2021 | Okumura et al. |
| 11,122,073 B1 | 9/2021 | Cai et al. |
| 11,126,723 B2 | 9/2021 | Bagulho Monteiro Pereira |
| D940,742 S | 1/2022 | Vickers et al. |
| D946,596 S | 3/2022 | Ahmed |
| D947,238 S | 3/2022 | Nie et al. |
| D949,884 S | 4/2022 | Capela et al. |
| 11,334,832 B2 | 5/2022 | Dumoulin et al. |
| 11,379,773 B2 | 7/2022 | Vescio |
| D960,191 S | 8/2022 | Feit et al. |
| D960,924 S | 8/2022 | Nordstrom et al. |
| 11,455,322 B2 | 9/2022 | Yang et al. |
| D971,933 S | 12/2022 | Ahmed |
| D982,604 S | 4/2023 | Pacione et al. |
| D983,820 S | 4/2023 | Dunnette et al. |
| D987,668 S | 5/2023 | Mairs et al. |
| 11,652,834 B2 | 5/2023 | Gladstone et al. |
| D991,943 S | 7/2023 | Fawcett et al. |
| 11,727,114 B2 | 8/2023 | Bagulho Monteiro Pereira |
| 11,777,976 B2 | 10/2023 | Boyer et al. |
| D1,008,289 S | 12/2023 | Yazdansepas |
| D1,010,666 S | 1/2024 | Cai |
| D1,010,677 S | 1/2024 | Clymer |
| D1,014,517 S | 2/2024 | Russell |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0011601 A1 | 1/2003 | Itoh et al. |
| 2003/0050862 A1 | 3/2003 | Bleicken et al. |
| 2003/0074248 A1 | 4/2003 | Braud et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0088570 A1 | 5/2004 | Roberts et al. |
| 2004/0098375 A1 | 5/2004 | DeCarlo |
| 2004/0111358 A1 | 6/2004 | Lange et al. |
| 2004/0133561 A1 | 7/2004 | Burke |
| 2004/0133689 A1 | 7/2004 | Vasisht |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0065754 A1 | 3/2005 | Schaf et al. |
| 2005/0065807 A1 | 3/2005 | DeAngelis et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0228899 A1 | 10/2005 | Wendkos et al. |
| 2005/0234767 A1 | 10/2005 | Bolzman et al. |
| 2005/0278726 A1 | 12/2005 | Cano et al. |
| 2005/0278786 A1 | 12/2005 | Tippett et al. |
| 2006/0036335 A1 | 2/2006 | Banter et al. |
| 2006/0075490 A1 | 4/2006 | Boney et al. |
| 2006/0075494 A1 | 4/2006 | Bertman et al. |
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0230039 A1 | 10/2006 | Shull et al. |
| 2006/0253458 A1 | 11/2006 | Dixon et al. |
| 2006/0253581 A1 | 11/2006 | Dixon et al. |
| 2006/0271564 A1 | 11/2006 | Meng Muntz et al. |
| 2007/0016948 A1 | 1/2007 | Dubrovsky et al. |
| 2007/0067845 A1 | 3/2007 | Wiemer et al. |

(56) References Cited

U.S. PATENT DOCUMENTS

| | | |
|---|---|---|
| 2007/0113282 A1 | 5/2007 | Ross |
| 2007/0136622 A1 | 6/2007 | Price et al. |
| 2007/0143851 A1 | 6/2007 | Nicodemus et al. |
| 2007/0174915 A1 | 7/2007 | Gribble et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0017526 A1 | 1/2008 | Prescott et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0097980 A1 | 4/2008 | Sullivan |
| 2008/0127338 A1 | 5/2008 | Cho et al. |
| 2008/0140495 A1 | 6/2008 | Bhamidipaty et al. |
| 2008/0140728 A1 | 6/2008 | Fraser et al. |
| 2008/0148408 A1 | 6/2008 | Kao et al. |
| 2008/0162931 A1 | 7/2008 | Lord et al. |
| 2008/0172382 A1 | 7/2008 | Prettejohn |
| 2008/0175266 A1 | 7/2008 | Alperovitch et al. |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0222736 A1 | 9/2008 | Boodaei et al. |
| 2008/0262895 A1 | 10/2008 | Hofmeister et al. |
| 2008/0270458 A1 | 10/2008 | Gvelesiani |
| 2009/0019525 A1 | 1/2009 | Yu et al. |
| 2009/0024663 A1 | 1/2009 | McGovern |
| 2009/0044272 A1 | 2/2009 | Jarrett |
| 2009/0064337 A1 | 3/2009 | Chien |
| 2009/0094265 A1 | 4/2009 | Vlachos et al. |
| 2009/0094697 A1 | 4/2009 | Provos et al. |
| 2009/0125427 A1 | 5/2009 | Atwood et al. |
| 2009/0132861 A1 | 5/2009 | Costa et al. |
| 2009/0147026 A1 | 6/2009 | Buck et al. |
| 2009/0150999 A1 | 6/2009 | Dewey et al. |
| 2009/0161629 A1 | 6/2009 | Purkayastha et al. |
| 2009/0193054 A1 | 7/2009 | Karimisetty et al. |
| 2009/0204235 A1 | 8/2009 | Dubinsky |
| 2009/0216700 A1 | 8/2009 | Bouchard et al. |
| 2009/0228830 A1 | 9/2009 | Herz et al. |
| 2009/0265787 A9 | 10/2009 | Baudoin et al. |
| 2009/0276835 A1 | 11/2009 | Jackson et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0024033 A1 | 1/2010 | Kang et al. |
| 2010/0042605 A1 | 2/2010 | Cheng et al. |
| 2010/0057582 A1 | 3/2010 | Arfin et al. |
| 2010/0114634 A1 | 5/2010 | Christiansen et al. |
| 2010/0114757 A1 | 5/2010 | Jeng et al. |
| 2010/0180344 A1 | 7/2010 | Malyshev et al. |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0235910 A1 | 9/2010 | Ku et al. |
| 2010/0251000 A1 | 9/2010 | Lyne et al. |
| 2010/0251371 A1 | 9/2010 | Brown |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2010/0309206 A1 | 12/2010 | Xie et al. |
| 2011/0060950 A1 | 3/2011 | Waldron et al. |
| 2011/0099620 A1 | 4/2011 | Stavrou et al. |
| 2011/0106920 A1 | 5/2011 | Longo |
| 2011/0137704 A1 | 6/2011 | Mitra et al. |
| 2011/0145168 A1 | 6/2011 | Dirnstorfer et al. |
| 2011/0145576 A1 | 6/2011 | Bettan |
| 2011/0148880 A1 | 6/2011 | De Peuter |
| 2011/0185403 A1 | 7/2011 | Dolan et al. |
| 2011/0185427 A1 | 7/2011 | Aciicmez et al. |
| 2011/0213742 A1 | 9/2011 | Lemmond et al. |
| 2011/0219455 A1 | 9/2011 | Bhagwan et al. |
| 2011/0225085 A1 | 9/2011 | Takeshita et al. |
| 2011/0231395 A1 | 9/2011 | Vadlamani et al. |
| 2011/0239294 A1 | 9/2011 | Kim et al. |
| 2011/0239300 A1 | 9/2011 | Klein et al. |
| 2011/0249002 A1 | 10/2011 | Duplessis et al. |
| 2011/0276514 A1 | 11/2011 | Kalagnanam et al. |
| 2011/0282997 A1 | 11/2011 | Prince et al. |
| 2011/0289582 A1 | 11/2011 | Kejriwal et al. |
| 2011/0296519 A1 | 12/2011 | Ide et al. |
| 2012/0008974 A1 | 1/2012 | Kawai et al. |
| 2012/0036263 A1 | 2/2012 | Madden et al. |
| 2012/0036580 A1 | 2/2012 | Gorny et al. |
| 2012/0059823 A1 | 3/2012 | Barber et al. |
| 2012/0079596 A1 | 3/2012 | Thomas et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0174219 A1 | 7/2012 | Hernandez et al. |
| 2012/0198558 A1 | 8/2012 | Liu et al. |
| 2012/0215892 A1 | 8/2012 | Wanser et al. |
| 2012/0221376 A1 | 8/2012 | Austin |
| 2012/0254993 A1 | 10/2012 | Sallam |
| 2012/0255021 A1 | 10/2012 | Sallam |
| 2012/0255027 A1 | 10/2012 | Kanakapura et al. |
| 2012/0290498 A1 | 11/2012 | Jones |
| 2012/0291129 A1 | 11/2012 | Shulman et al. |
| 2013/0014253 A1 | 1/2013 | Neou et al. |
| 2013/0055070 A1 | 2/2013 | Sacks et al. |
| 2013/0055386 A1 | 2/2013 | Kim et al. |
| 2013/0060351 A1 | 3/2013 | Imming et al. |
| 2013/0080341 A1 | 3/2013 | Veeramachaneni et al. |
| 2013/0080505 A1 | 3/2013 | Nielsen et al. |
| 2013/0086521 A1 | 4/2013 | Grossele et al. |
| 2013/0086681 A1 | 4/2013 | Jaroch |
| 2013/0086687 A1 | 4/2013 | Chess et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0145437 A1 | 6/2013 | Zaitsev |
| 2013/0173791 A1 | 7/2013 | Longo |
| 2013/0212479 A1 | 8/2013 | Willis et al. |
| 2013/0227078 A1 | 8/2013 | Wei et al. |
| 2013/0227697 A1 | 8/2013 | Zandani |
| 2013/0238527 A1 | 9/2013 | Jones |
| 2013/0263034 A1 | 10/2013 | Bruck et al. |
| 2013/0263270 A1 | 10/2013 | Cote et al. |
| 2013/0275176 A1 | 10/2013 | Brown et al. |
| 2013/0276056 A1 | 10/2013 | Epstein |
| 2013/0282406 A1 | 10/2013 | Snyder et al. |
| 2013/0291105 A1 | 10/2013 | Yan |
| 2013/0298244 A1 | 11/2013 | Kumar et al. |
| 2013/0305368 A1 | 11/2013 | Ford |
| 2013/0318594 A1 | 11/2013 | Hoy et al. |
| 2013/0333038 A1 | 12/2013 | Chien |
| 2013/0345978 A1 | 12/2013 | Lush et al. |
| 2013/0347116 A1 | 12/2013 | Flores et al. |
| 2014/0006129 A1 | 1/2014 | Heath |
| 2014/0019196 A1 | 1/2014 | Wiggins et al. |
| 2014/0040747 A1 | 2/2014 | Gardenfors |
| 2014/0052998 A1 | 2/2014 | Bloom et al. |
| 2014/0101006 A1 | 4/2014 | Pitt |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0137254 A1 | 5/2014 | Ou et al. |
| 2014/0137257 A1 | 5/2014 | Martinez et al. |
| 2014/0146370 A1 | 5/2014 | Banner et al. |
| 2014/0173066 A1 | 6/2014 | Newton et al. |
| 2014/0173736 A1 | 6/2014 | Liu |
| 2014/0189098 A1 | 7/2014 | MaGill et al. |
| 2014/0189864 A1 | 7/2014 | Wang et al. |
| 2014/0204803 A1 | 7/2014 | Nguyen et al. |
| 2014/0206970 A1 | 7/2014 | Wesley et al. |
| 2014/0237545 A1 | 8/2014 | Mylavarapu et al. |

(56) References Cited

U.S. PATENT DOCUMENTS

| | | |
|---|---|---|
| 2014/0244317 A1 | 8/2014 | Roberts et al. |
| 2014/0282261 A1 | 9/2014 | Ranz et al. |
| 2014/0283056 A1 | 9/2014 | Bachwani et al. |
| 2014/0283067 A1 | 9/2014 | Call et al. |
| 2014/0283068 A1 | 9/2014 | Call et al. |
| 2014/0283069 A1 | 9/2014 | Call et al. |
| 2014/0288996 A1 | 9/2014 | Rence et al. |
| 2014/0304816 A1 | 10/2014 | Klein et al. |
| 2014/0330616 A1 | 11/2014 | Lyras |
| 2014/0334336 A1 | 11/2014 | Chen et al. |
| 2014/0337086 A1 | 11/2014 | Asenjo et al. |
| 2014/0337633 A1 | 11/2014 | Yang et al. |
| 2014/0344332 A1 | 11/2014 | Giebler |
| 2015/0033331 A1 | 1/2015 | Stern et al. |
| 2015/0033341 A1 | 1/2015 | Schmidtler et al. |
| 2015/0052607 A1 | 2/2015 | Al Hamami |
| 2015/0074579 A1 | 3/2015 | Gladstone et al. |
| 2015/0081860 A1 | 3/2015 | Kuehnel et al. |
| 2015/0088783 A1 | 3/2015 | Mun |
| 2015/0156084 A1 | 6/2015 | Kaminsky et al. |
| 2015/0180883 A1 | 6/2015 | Aktas et al. |
| 2015/0195299 A1 | 7/2015 | Zoldi et al. |
| 2015/0207776 A1 | 7/2015 | Morin et al. |
| 2015/0213259 A1 | 7/2015 | Du et al. |
| 2015/0248280 A1 | 9/2015 | Pillay et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0331932 A1 | 11/2015 | Georges et al. |
| 2015/0339479 A1 | 11/2015 | Wang et al. |
| 2015/0347754 A1 | 12/2015 | Born |
| 2015/0347756 A1 | 12/2015 | Hidayat et al. |
| 2015/0350229 A1 | 12/2015 | Mitchell |
| 2015/0365587 A1 | 12/2015 | Ha et al. |
| 2015/0381649 A1 | 12/2015 | Schultz et al. |
| 2016/0014081 A1 | 1/2016 | Don, Jr. et al. |
| 2016/0023639 A1 | 1/2016 | Cajiga et al. |
| 2016/0028746 A1 | 1/2016 | Tonn |
| 2016/0036849 A1 | 2/2016 | Zakian |
| 2016/0065613 A1 | 3/2016 | Cho et al. |
| 2016/0078382 A1 | 3/2016 | Watkins et al. |
| 2016/0088015 A1 | 3/2016 | Sivan et al. |
| 2016/0104071 A1 | 4/2016 | Brueckner |
| 2016/0119373 A1 | 4/2016 | Fausto et al. |
| 2016/0140466 A1 | 5/2016 | Sidebottom et al. |
| 2016/0142419 A1 | 5/2016 | Antipa et al. |
| 2016/0142428 A1 | 5/2016 | Pastore et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173520 A1 | 6/2016 | Foster et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1* | 7/2016 | Boyer ............... H04L 63/1433 726/25 |
| 2016/0212101 A1 | 7/2016 | Reshadi et al. |
| 2016/0239772 A1* | 8/2016 | Dahlberg ............... G06F 16/23 |
| 2016/0241560 A1 | 8/2016 | Reshadi et al. |
| 2016/0248797 A1 | 8/2016 | Yampolskiy et al. |
| 2016/0248800 A1 | 8/2016 | Ng et al. |
| 2016/0253500 A1 | 9/2016 | Alme et al. |
| 2016/0259945 A1 | 9/2016 | Yampolskiy et al. |
| 2016/0291860 A1 | 10/2016 | Higuchi et al. |
| 2016/0335232 A1 | 11/2016 | Born et al. |
| 2016/0337387 A1 | 11/2016 | Hu et al. |
| 2016/0344769 A1 | 11/2016 | Li |
| 2016/0344801 A1 | 11/2016 | Akkarawittayapoom |
| 2016/0359875 A1 | 12/2016 | Kim et al. |
| 2016/0364496 A1 | 12/2016 | Li |
| 2016/0373485 A1 | 12/2016 | Kamble |
| 2016/0378978 A1 | 12/2016 | Singla et al. |
| 2017/0048267 A1 | 2/2017 | Yampolskiy et al. |
| 2017/0063901 A1 | 3/2017 | Muddu et al. |
| 2017/0063923 A1 | 3/2017 | Yang et al. |
| 2017/0104783 A1 | 4/2017 | Vanunu et al. |
| 2017/0126719 A1 | 5/2017 | Mason |
| 2017/0142148 A1 | 5/2017 | Bußer et al. |
| 2017/0161253 A1 | 6/2017 | Silver |
| 2017/0161409 A1 | 6/2017 | Martin |
| 2017/0213292 A1 | 7/2017 | Sweeney et al. |
| 2017/0221072 A1 | 8/2017 | AthuluruTlrumala et al. |
| 2017/0223002 A1 | 8/2017 | Sabin et al. |
| 2017/0236078 A1 | 8/2017 | Rasumov |
| 2017/0237764 A1 | 8/2017 | Rasumov |
| 2017/0264623 A1 | 9/2017 | Ficarra et al. |
| 2017/0277892 A1 | 9/2017 | MacDermid |
| 2017/0279843 A1 | 9/2017 | Schultz et al. |
| 2017/0289109 A1 | 10/2017 | Caragea |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324555 A1 | 11/2017 | Wu et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0041521 A1 | 2/2018 | Zhang et al. |
| 2018/0052999 A1 | 2/2018 | Mitola, III |
| 2018/0088968 A1 | 3/2018 | Myhre et al. |
| 2018/0103043 A1 | 4/2018 | Kupreev et al. |
| 2018/0121659 A1 | 5/2018 | Sawhney et al. |
| 2018/0123934 A1 | 5/2018 | Gissing et al. |
| 2018/0124091 A1 | 5/2018 | Sweeney et al. |
| 2018/0124110 A1 | 5/2018 | Hunt et al. |
| 2018/0139180 A1 | 5/2018 | Napchi et al. |
| 2018/0146004 A1 | 5/2018 | Belfiore, Jr. et al. |
| 2018/0157468 A1 | 6/2018 | Stachura |
| 2018/0191768 A1 | 7/2018 | Broda et al. |
| 2018/0218157 A1 | 8/2018 | Price et al. |
| 2018/0219910 A1 | 8/2018 | Greenshpan et al. |
| 2018/0285414 A1 | 10/2018 | Kondiles et al. |
| 2018/0322584 A1 | 11/2018 | Crabtree et al. |
| 2018/0324201 A1 | 11/2018 | Lowry et al. |
| 2018/0332076 A1 | 11/2018 | Callahan et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0349641 A1 | 12/2018 | Barday et al. |
| 2018/0365519 A1 | 12/2018 | Pollard et al. |
| 2018/0375896 A1 | 12/2018 | Wang et al. |
| 2018/0375953 A1 | 12/2018 | Casassa Mont et al. |
| 2019/0034845 A1 | 1/2019 | Mo et al. |
| 2019/0052650 A1 | 2/2019 | Hu et al. |
| 2019/0065545 A1 | 2/2019 | Hazel et al. |
| 2019/0065748 A1 | 2/2019 | Foster et al. |
| 2019/0079869 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0163914 A1 | 5/2019 | Steele et al. |
| 2019/0166152 A1 | 5/2019 | Steele et al. |
| 2019/0166156 A1 | 5/2019 | King-Wilson |
| 2019/0179490 A1 | 6/2019 | Barday et al. |
| 2019/0215331 A1 | 7/2019 | Anakata et al. |
| 2019/0238439 A1 | 8/2019 | Pugh et al. |
| 2019/0297106 A1 | 9/2019 | Geil et al. |
| 2019/0303574 A1 | 10/2019 | Lamay et al. |
| 2019/0303584 A1 | 10/2019 | Yang et al. |
| 2019/0362280 A1 | 11/2019 | Vescio |
| 2019/0379632 A1 | 12/2019 | Dahlberg et al. |
| 2019/0391707 A1 | 12/2019 | Ristow et al. |
| 2019/0392252 A1 | 12/2019 | Fighel et al. |
| 2020/0012794 A1 | 1/2020 | Saldanha et al. |
| 2020/0053127 A1 | 2/2020 | Brotherton et al. |
| 2020/0065213 A1 | 2/2020 | Poghosyan et al. |
| 2020/0074084 A1 | 3/2020 | Dorrans et al. |

(56) References Cited

U.S. PATENT DOCUMENTS

| | | |
|---|---|---|
| 2020/0092172 A1 | 3/2020 | Kumaran et al. |
| 2020/0097845 A1 | 3/2020 | Shaikh et al. |
| 2020/0104488 A1 | 4/2020 | Li et al. |
| 2020/0106798 A1 | 4/2020 | Lin |
| 2020/0120118 A1 | 4/2020 | Shu et al. |
| 2020/0125734 A1 | 4/2020 | Light et al. |
| 2020/0134175 A1 | 4/2020 | Marwah et al. |
| 2020/0183655 A1 | 6/2020 | Barday et al. |
| 2020/0186546 A1 | 6/2020 | Dichiu et al. |
| 2020/0272763 A1 | 8/2020 | Brannon et al. |
| 2020/0285737 A1 | 9/2020 | Kraus et al. |
| 2020/0356689 A1 | 11/2020 | McEnroe et al. |
| 2020/0356695 A1 | 11/2020 | Brannon et al. |
| 2021/0019424 A1* | 1/2021 | Light .................. G06N 20/10 |
| 2021/0064746 A1 | 3/2021 | Koide et al. |
| 2021/0073377 A1 | 3/2021 | Coull et al. |
| 2021/0133331 A1* | 5/2021 | Lipkis ................. H04L 63/1483 |
| 2021/0266324 A1* | 8/2021 | Light ................... H04L 41/22 |
| 2021/0342785 A1 | 11/2021 | Mann et al. |
| 2022/0191232 A1 | 6/2022 | Cai et al. |
| 2023/0030077 A1 | 2/2023 | Park et al. |

OTHER PUBLICATIONS

U.S. Appl. No. 15/377,574, U.S. Pat. No. 9,705,932, Methods and Systems for Creating, De-Duplicating, and Accessing Data Using an Object Storage System, filed Dec. 13, 2016.
U.S. Appl. No. 14/021,585 U.S. Pat. No. 9,438,615 Published as: US2015/0074579, Security Risk Management, filed Sep. 9, 2013.
U.S. Appl. No. 15/216,955 U.S. Pat. No. 10,326,786 Published as: US 2016/0330231, Methods for Using Organizational Behavior for Risk Ratings, filed Jul. 22, 2016.
U.S. Appl. No. 15/239,063 U.S. Pat. No. 10,341,370 Published as: US2017/0093901, Security Risk Management, filed Aug. 17, 2016.
U.S. Appl. No. 16/405,121 U.S. Pat. No. 10,785,245 Published as: US2019/0260791, Methods for Using Organizational Behavior for Risk Ratings, filed May 7, 2019.
U.S. Appl. No. 17/025,930 Published as: US2021/0006581, Methods for Using Organizational Behavior for Risk Ratings, filed Sep. 18, 2020.
U.S. Appl. No. 18/297,863, Methods for Using Organizational Behavior for Risk Ratings, filed Apr. 10, 2023.
U.S. Appl. No. 13/240,572 U.S. Pat. No. 10,805,331 Published as: US2016/0205126, Information Technology Security Assessment System, filed Sep. 22, 2011.
U.S. Appl. No. 14/944,484 U.S. Pat. No. 9,973,524 Published as: US2016/0323308, Information Technology Security Assessment System, filed Nov. 18, 2015.
U.S. Appl. No. 17/069,151 Published as: US2021/0211454, Information Technology Security Assessment System, filed Oct. 13, 2020.
U.S. Appl. No. 15/142,677 U.S. Pat. No. 9,830,569 Published as: US2016/0239772, Security Assessment Using Service Provider Digital Asset Information, filed Apr. 29, 2016.
U.S. Appl. No. 15/134,845 U.S. Pat. No. 9,680,858, Annotation Platform for a Security Risk System, filed Apr. 21, 2016.
U.S. Appl. No. 15/044,952 U.S. Pat. No. 11,182,720 Published as: US2017/0236077, Relationships Among Technology Assets and Services and the Entities Responsible for Them, filed Feb. 16, 2016.
U.S. Appl. No. 15/089,375 U.S. Pat. No. 10,176,445 Published as: US2017/0236079, Relationships Among Technology Assets and Services and the Entities Responsible for Them, filed Apr. 1, 2016.
U.S. Appl. No. 29/598,298 Des. 835,631, Computer Display Screen With Graphical User Interface, filed Mar. 24, 2017.
U.S. Appl. No. 29/598,299 Des. 818,475, Computer Display With Security Ratings Graphical User Interface, filed Mar. 24, 2017.
U.S. Appl. No. 29/599,622 Des. 847,169, Computer Display With Security Ratings Graphical User Interface, filed Apr. 5, 2017.
U.S. Appl. No. 29/599,620 Des. 846,562, Computer Display With Security Ratings Graphical User Interface, filed Apr. 5, 2017.
U.S. Appl. No. 16/015,686 U.S. Pat. No. 10,425,380 Published as: US2018/0375822, Methods for Mapping IP Addresses and Domains to Organizations Using User Activity Data, filed Jun. 22, 2018.
U.S. Appl. No. 16/543,075 U.S. Pat. No. 10,554,619 Published as: US2019/0379632, Methods for Mapping IP Addresses and Domains to Organizations Using User Activity Data, filed Aug. 16, 2019.
U.S. Appl. No. 16/738,825 U.S. Pat. No. 10,893,021 Published as: US2020/0153787, Methods for Mapping IP Addresses and Domains to Organizations Using User Activity Data, filed Jan. 9, 2020.
U.S. Appl. No. 17/146,064 Published as: US2021/0218702, Methods for Mapping IP Addresses and Domains to Organizations Using User Activity Data, filed Jan. 11, 2021.
U.S. Appl. No. 15/918,286 U.S. Pat. No. 10,257,219, Correlated Risk in Cybersecurity, filed Mar. 12, 2018.
U.S. Appl. No. 16/292,956 U.S. Pat. No. 10,594,723 Published as: US2019/0297106, Correlated Risk in Cybersecurity, filed Mar. 5, 2019.
U.S. Appl. No. 16/795,056 U.S. Pat. No. 10,931,705 Published as: US2020/0195681, Correlated Risk in Cybersecurity, filed Feb. 19, 2020.
U.S. Appl. No. 17/179,630 Published as US2021/0176269, Correlated Risk in Cybersecurity, filed Feb. 19, 2021.
U.S. Appl. No. 16/170,680 U.S. Pat. No. 10,521,583, Systems and Methods for Remote Detection of Software Through Browser Webinjects, filed Oct. 25, 2018.
U.S. Appl. No. 16/688,647 U.S. Pat. No. 10,776,483 Published as: US2020/0134174, Systems and Methods for Remote Detection of Software Through Browser Webinjects, filed Nov. 19, 2019.
U.S. Appl. No. 17/000,135 U.S. Pat. No. 11,126,723 Published as: US2021/0004457, Systems and Methods for Remote Detection of Software Through Browser Webinjects, filed Aug. 21, 2020.
U.S. Appl. No. 17/401,683 Published as: US2021/0374243, Systems and Methods for Remote Detection of Software Through Browser Webinjects, filed Aug. 13, 2021.
U.S. Appl. No. 15/954,921 U.S. Pat. No. 10,812,520 Published as: US2019/0319979, Systems and Methods for External Detection of Misconfigured Systems, filed Apr. 17, 2018.
U.S. Appl. No. 17/014,495 Published as: US2020/0404017, Systems and Methods for External Detection of Misconfigured Systems, filed Sep. 8, 2020.
U.S. Appl. No. 18/302,925, Systems and Methods for External Detection of Misconfigured Systems, filed Apr. 19, 2023.
U.S. Appl. No. 16/549,764 Published as: US2021/0058421, Systems and Methods for Inferring Entity Relationships via Network Communications of Users or User Devices, filed Aug. 23, 2019.
U.S. Appl. No. 16/787,650 U.S. Pat. No. 10,749,893, Systems and Methods for Inferring Entity Relationships via Network Communications of Users or User Devices, filed Feb. 11, 2020
U.S. Appl. No. 16/583,991 U.S. Pat. No. 10,848,382, Systems and Methods for Network Asset Discovery and Association Thereof With Entities, filed Sep. 26, 2019.
U.S. Appl. No. 17/085,550 U.S. Pat. No. 11,329,878 Published as: US2021/0099347, Systems and Methods for Network Asset Discovery and Association Thereof With Entities, filed Oct. 30, 2020.
U.S. Appl. No. 29/666,942 Des. 892,135, Computer Display With Graphical User Interface, filed Oct. 17, 2018.
U.S. Appl. No. 16/360,641 U.S. Pat. No. 11,200,323 Published as: US2020/0125734, Systems and Methods for Forecasting Cybersecurity Ratings Based on Event-Rate Scenarios, filed Mar. 21, 2019.
U.S. Appl. No. 17/523166 Published as: US2022/0121753, Systems and Methods for Forecasting Cybersecurity Ratings Based on Event-Rate Scenarios, filed Nov. 10, 2021.
U.S. Appl. No. 16/514,771 U.S. Pat. No. 10,726,136, Systems and Methods for Generating Security Improvement Plans for Entities, filed Jul. 17, 2019.
U.S. Appl. No. 16/922,673 U.S. Pat. No. 11,030,325 Published as: US2021/0019424, Systems and Methods for Generating Security Improvement Plans for Entities, filed Jul. 7, 2020.
U.S. Appl. No. 17/307,577 Published as: US2021/0211454, Systems and Methods for Generating Security Improvement Plans for Entities, filed May 4, 2021.
U.S. Appl. No. 18/138,803, Systems and Methods for Generating Security Improvement Plans for Entities, filed Apr. 25, 2023.

(56) References Cited

OTHER PUBLICATIONS

U.S. Appl. No. 29/677306 Des. 905,702, Computer Display Screen With Corporate Hierarchy Graphical User Interface, filed Jan. 18, 2019.
U.S. Appl. No. 16/775,840 U.S. Pat. No. 10,791,140, Systems and Methods for Assessing Cybersecurity State of Entities Based on Computer Network Characterization, filed Jan. 29, 2020.
U.S. Appl. No. 17/018,587 U.S. Pat. No. 11,050,779, Systems and Methods for Assessing Cybersecurity State of Entities Based on Computer Network Characterization, filed Sep. 11, 2020.
U.S. Appl. No. 17/346,970, Systems and Methods for Assessing Cybersecurity State of Entities Based on Computer Network Characterization, filed Jun. 14, 2021.
U.S. Appl. No. 16/779,437 U.S. Pat. No. 10,893,067 Published as: US2021/0243221, Systems and Methods for Rapidly Generating Security Ratings, filed Jan. 31, 2020.
U.S. Appl. No. 17/132,512 Published as: US2021/0243221, Systems and Methods for Rapidly Generating Security Ratings, filed Dec. 23, 2020.
U.S. Appl. No. 18/158,594, Systems and Methods for Rapidly Generating Security Ratings, filed Jan. 24, 2023.
U.S. Appl. No. 17/119,822 U.S. Pat. No. 11,122,073, Systems and Methods for Cybersecurity Risk Mitigation and Management, filed Dec. 11, 2020.
U.S. Appl. No. 29/815,855 US2021/0099347, Computer Display With a Graphical User Interface for Cybersecurity Risk Management, filed Nov. 17, 2021.
U.S. Appl. No. 17/392,521 Published as US 2022/0191232, Systems and Methods for Cybersecurity Risk Mitigation and Management, filed Aug. 3, 2021.
U.S. Appl. No. 18/141,654, Systems and Methods for Cybersecurity Risk Mitigation and Management, filed May 1, 2023.
U.S. Appl. No. 16/802,232 U.S. Pat. No. 10,764,298, Systems and Methods for Improving a Security Profile of an Entity Based on Peer Security Profiles, filed Feb. 26, 2020.
U.S. Appl. No. 16/942,452 U.S. Pat. No. 11,265,330 Published as: US2021/0266324, Systems and Methods for Improving a Security Profile of an Entity Based on Peer Security Profiles, filed Jul. 29, 2020.
U.S. Appl. No. 29/725724, Computer Display With Risk Vectors Graphical User Interface, filed Feb. 26, 2020.
U.S. Appl. No. 29/736,641 Des. 937,870, Computer Display With Peer Analytics Graphical User Interface, filed Jun. 2, 2020.
U.S. Appl. No. 17/039,675 U.S. Pat. No. 11,032,244 Published as: US2021/0099428, Systems and Methods for Determining Asset Importance in Security Risk Management, filed Sep. 30, 2020.
U.S. Appl. No. 17/320,997 Published as US 2021/0344647, Systems and Methods for Determining Asset Importance in Security Risk Management, filed May 14, 2021.
U.S. Appl. No. 16/884,607 U.S. Pat. No. 11,023,585, Systems and Methods for Managing Cybersecurity Alerts, filed May 27, 2020.
U.S. Appl. No. 17/236,594 Published as: US2021/0374246, Systems and Methods for Managing Cybersecurity Alerts, filed Apr. 21, 2021.
U.S. Appl. No. 17/710,168 Published as: US2022/0318400, Systems and Methods for Assessing Cybersecurity Risk in a Work From Home Environment, filed Mar. 31, 2022.
U.S. Appl. No. 17/945,337 Published as US2023/0091953, Systems and Methods for Precomputation of Digital Asset Inventories, filed Sep. 15, 2022.
U.S. Appl. No. 17/856,217 Published as: US2023/0004655, Systems and Methods for Accelerating Cybersecurity Assessments, filed Jul. 1, 2022.
"Agreed Upon Procedures," Version 4.0, BITS, The Financial Institution Shared Assessments Program, Assessment Guide, Sep. 2008, 56 pages.
"Amazon Mechanical Turk," accessed on the internet at https://www.mturk.com/, (Nov. 9, 2018), 7 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Computer Network Graph, http://www.opte.org," accessed on the internet at http://www.opte.org, (Nov. 9, 2018), 1 page.
"Creating Transparency with Palantir," accessed on the internet at https://www.youtube.com/watch?v=8cbGChfagUA; Jul. 5, 2012; 1 page.
"Master Security Criteria," Version 3.0, BITS Financial Services Security Laboratory, Oct. 2001, 47 pages.
"Neo4j (neo4j.com)," accessed on the internet at https://web.archive.org/web/20151220150341/http://neo4j.com:80/developer/guide-data-visualization/; Dec. 20, 2015; 1 page.
"Palantir Cyber: Uncovering malicious behavior at petabyte scale," accessed on the internet at https://www.youtube.com/watch?v=EhYezV06EE; Dec. 21, 2012; 1 page.
"Palantir.com," accessed on the internet at http://www.palantir.com/; Dec. 2015; 2 pages.
"Plugging the Right Holes," Lab Notes, MIT Lincoln Library, Posted Jul. 2008, retrieved Sep. 14, 2010 from http://www.II.miLedufpublicationsflabnotesfpluggingtherightho! . . . , 2 pages.
"Rapid7 Nexpose Vulnerability Scanner," accessed on the internet at https://web.archive.org/web/20170520082737/https://www.rapid7.com/products/nexpose/; May 20, 2017.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Tenable Nessus Network Vulnerability Scanner," accessed on the internet at https://www.tenable.com/products/nessus/nessus-professional, (Nov. 9, 2018), 13 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business RISK Team, 52 pages.
U.S. Appl. No. 13/240,572, as of Nov. 18, 2015, 45 pages.
Artz, Michael Lyle, "NetSPA: A Network Security Planning Architecture," Massachusetts Institute of Technology, May 24, 2002, 97 pages.
Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).
Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).
Bhilare et al., "Protecting Intellectual Property and Sensitive Information in Academic Campuses from Trusted Insiders: Leveraging Active Directory", SIGUCC, Oct. 2009 (5 pages).
BitSight, "Cyber Security Myths Versus Reality: How Optimism Bias Contributes to Inaccurate Perceptions of Risk", Jun. 2015, Dimensional Research, pp. 1-9.
Borgatti, et al., "On Social Network Analysis in a Supply Chain Context," Journal of Supply Chain Management; 45(2): 5-22; Apr. 2009, 18 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The Mckinsey Quarterly, No. 4, 2003, pp. 40-49.
Camelo, "Botnet Cluster Identification," Sep. 2014, 90 pages.

(56) References Cited

OTHER PUBLICATIONS

Camelo, "Condenser: A Graph-based Approach for Detecting Botnets," AnubisNetworks R&D, Amadora, Portugal and Centria, Universidade NOVA de Lisboa, Portugal, 8 pages, (Oct. 31, 2014).
Carstens, et al., "Modeling Company Risk and Importance in Supply Graphs," European Semantic Web Conference 2017: The Semantic Web, pp. 18-31, (May 7, 2017).
Chernyshev, M. et al., "On 802.11 Access Point Locatability and Named Entity Recognition in Service Set Identifiers", IEEE Trans. on Info. and Sec., vol. 11 No. 3 (Mar. 2016).
Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.
Chuvakin, "SIEM: Moving beyond compliance", RSA White Paper (2010) (16 pages).
Computer Network Graph-Bees, http://bioteams.com/2007/04/30/visualizing_complex_networks.html, date accessed Sep. 28, 2016, 2 pages.
Computer Network Graph-Univ. of Michigan, http://people.cst.cmich.edu/liao1q/research.shtml, date accessed Sep. 28, 2016, 5 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages, (Mar. 15, 2009).
Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Gephi (gephi.org), accessed on the internet at https://web.archive.org/web/20151216223216/https://gephi.org/; Dec. 16, 2015; 1 page.
Gilgur, et al., "Percentile-Based Approach to Forecasting Workload Growth" Proceedings of CMG'15 Performance and Capacity International Conference by the Computer Measurement Group. No. 2015 (Year:2015), 16 pages.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (Policy). Http://ieeexplore.ieee.org/stamp/stamp.jsp?arnumber=5976796. 8 pages, (Jun. 6, 2011).
Hacking Exposed 6, S. McClure et al., copyright 2009, 37 pages.
Ingols, Kyle, et al., "Modeling Modern Network Attacks and Countermeasures Using Attack Graphs," MIT Lincoln Laboratory, 16 pages, (Dec. 7, 2009).
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to Nist Scap Conference, Sep. 24, 2008, 59 pages.
Jean, "Cyber Security: How to use graphs to do an attack analysis," accessed on the internet at https://linkurio.us/blog/cyber-security-use-graphs-attack-analysis/; Aug. 2014, 11 pages.
Jin et al., "Identifying and tracking suspicious activities through IP gray space analysis", MineNet, Jun. 12, 2007 (6 pages).
Johnson, Eric, et al., "Information Risk and the Evolution of the Security Rating Industry," Mar. 24, 2009, 27 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
Li et al., "Finding the Linchpins of the Dark Web: a Study on Topologically Dedicated Hosts on Malicious Web Infrastructures", IEEE, 2013 (15 pages).
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages, (Oct. 23, 2006).
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber= 1258471 (Year: 2003).
Maltego XL, accessed on the Internet at https://www.paterva.com/web7/buy/maltego-clients/maltego-xl.php, 5 pages, (Nov. 7, 2018).
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
MaxMind, https://www.maxmind.com/en/about-maxmind, https://www.maxmind.com/en/geoip2-isp-database, date accessed Sep. 28, 2016, 3 pages.
McNab, "Network Security Assessment," copyright 2004, 13 pages.
McNab, "Network Security Assessment," copyright 2004, 56 pages.
Method Documentation, CNSS Risk Assessment Tool Version 1.1, Mar. 31, 2009, 24 pages.
Mile 2 CPTE Maltego Demo, accessed on the internet at https://www.youtube.com/watch?v=o2oNKOUzPOU; Jul. 12, 2012; 1 page.
Moradi, et al., "Quantitative Models for Supply Chain Management," IGI Global, 2012, 29 pages.
Morningstar Direct, dated to Nov. 12, 2020, morningstardirect.com [online]. Retrieved Feb. 26, 2021 from internet URL:https://web.archive.org/web/20201112021943/https://www.morningstar.com/products/direct, (Year: 2020).
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Noel, et al., "Big-Data Architecture for Cyber Attack Graphs, Representing Security Relationships in NoSQL Graph Databases," The MITRE Corporation, 2014, 6 pages.
Nye, John, "Avoiding Audit Overlap," Moody's Risk Services, Presentation, Source Boston, Mar. 14, 2008, 19 pages.
U.S. Appl. No. 14/021,585, as of Apr. 29, 2016, 2 pages.
U.S. Appl. No. 14/021,585, as of Nov. 18, 2015, 6 pages.
U.S. Appl. No. 13/240,572 and pending claims as of Mar. 22, 2016, 10 pages.
U.S. Appl. No. 13/240,572, as of Oct. 7, 2015, application as filed and pending claims, 45 pages.
U.S. Appl. No. 14/021,585 and pending claims as of Mar. 22, 2016, 2 pages.
U.S. Appl. No. 14/021,585 as of Oct. 7, 2015 and application as filed, 70 pages.
U.S. Appl. No. 14/944,484 and pending claims as of Mar. 22, 2016, 4 pages.
U.S. Appl. No. 61/386,156 as of Oct. 7, 2015. 2 pages.
Application as filed and pending claims for U.S. Appl. No. 13/240,572 as of Apr. 29, 2016, 46 pages.

(56) References Cited

OTHER PUBLICATIONS

Application as filed and pending claims for U.S. Appl. No. 14/944,484 as of Apr. 29, 2016, 4 pages.
Paxson, Vern, "How The Pursuit of Truth Led Me tSelling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Provos et al., "The Ghost In the Browser Analysis of Web-based Malware", 2007 (9 pages).
Rare Events, Oct. 2009, JASON, The MITRE Corporation, Oct. 2009, 104 pages.
Rees, L. P. et al., "Decision support for cybersecurity risk planning." Decision Support Systems 51.3 (2011): pp. 493-505.
Report to the Congress on Credit Scoring and Its Effects on the Availability and Affordability of Credit, Board of Governors of the Federal Reserve System, Aug. 2007, 304 pages.
RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
Santos, J. R. et al., "A framework for linking cybersecurity metrics to the modeling of macroeconomic interdependencies." Risk Analysis: An International Journal (2007) 27.5, pp. 1283-1297.
SBIR Phase I: Enterprise Cyber Security Scoring, CyberAnalytix, LLC, http://www.nsf.gov/awardsearch/showAward.do?AwardNumber=I013603, Apr. 28, 2010, 2 pages.
Search Query Report from IP.com (performed Apr. 27, 2020).
Search Query Report from IP.com (performed Jul. 29, 2022).
Security Warrior, Cyrus Peikari, Anton, Chapter 8: Reconnaissance, 6 pages, (Jan. 2004).
Seigneur et al., A Survey of Trust and Risk Metrics for a BYOD Mobile Worker World: Third International Conference on Social Eco-Informatics, 2013, 11 pages.
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Snort Intrusion Monitoring System, http://archive.oreilly.com/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Stone-Gross, Brett, et al., "FIRE: Finding Rogue Networks," 10 pages, (Dec. 7, 2009).
Taleb, Nassim N., et al., "The Six Mistakes Executives Make in Risk Management," Harvard Business Review, Oct. 2009, 5 pages.
The CIS Security Metrics v1.0.0, The Center for Internet Security, May 11, 2009, 90 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory," Int. J. Production Economics 126 (2010) 121-129.
Wikipedia, https://en.wikipedia.org/wiki/Crowdsourcing, date accessed Sep. 28, 2016, 25 pages.
Williams, Leevar, et al., "An Interactive Attack Graph Cascade and Reachability Display," MIT Lincoln Laboratory, 17 pages, (Jan. 2007).
Williams, Leevar, et al., "GARNET: A Graphical Attack Graph and Reachability Network Evaluation Tool," MIT Lincoln Library, VizSEC 2009, pp. 44-59, (Sep. 15, 2008).
Winship, C., "Models for sample selection bias", Annual review of sociology, 18(1) (Aug. 1992), pp. 327-350.
"Maltego 3 GUI user guide," 11 pages, Nov. 22, 2010 retrieved from Internet Archive Wayback Machine, https://web.archive.org/web/20101122112311/http://www.paterva.com:80/web5/documentation/Maltego3_crash_course.pdf on Aug. 30, 2024.
"User guide—Addendum to guide for Maltego 3.0.2," 20 pages, Nov. 23, 2010 retrieved from Internet Archive Wayback Machine, https://web.archive.org/web/20101123012539/http://www.paterva.com:80/web5/documentation/3.0.2.addendum.pdf on Aug. 30, 2024.
'834 Patent Claim Chart, *BitSight Technologies, Inc. v. NormShield Inc. d/b/a Black Kite Inc.*, Case No. 1:23-cv-12055-MJJ, D.I. 39-11 (Dec. 11, 2023), 28 pages.
"Maltego User Guide" webpage http://ctas.paterva.com/view/Userguide, 35 pages, Jun. 6, 2012, retrieved from Internet Archive Wayback Machine https://web.archive.org/web/20120606172056/http://ctas.paterva.com/view/Userguide on Sep. 6, 2024.
"MW Metadata", webpage https://mattw.io/youtube-metadata, 7 pages, retrieved on Aug. 21, 2024.
Anderson, H., "Nessus, Part 3: Analysing Reports," webpage http://www.securityfocus.com/infocus/1759, 5 pages, Oct. 20, 2006, retrieved from Internet Archive Wayback Machine https://web.archive.org/web/20061020202310/http://www.securityfocus.com/infocus/1759 on Aug. 16, 2024.
Aug. 29, 2024 Email from Melissa Nezhnik, 3 pages.
Curriculum Vitae of Kevin Almeroth Ph.D., 40 pages.
Declaration of Dr. Kevin Almeroth, 109 pages.
Declaration of Dr. Kevin Almeroth, 95 pages.
Declaration of Kevin Almeroth, Ph.D., 127 pages.
Declaration of Kevin Almeroth, Ph.D., 131 pages.
Declaration of Kevin C. Almeroth, PH.D. in support of Petition for Inter Partes Review of U.S. Pat. No. 11,777,976, 79 pages.
Declaration of Nathaniel Frank-White, 50 pages.
Declaration of Nathaniel Frank-White, 52 pages.
Declaration of Sylvia Hall-Ellis, Ph.D., 548 pages.
Gates, C., "New School Information Gathering," (2008), available at https://www.carnalOwnage.com/papers/17_Gates.pdf, 84 pages.
Gates, C., "Toorcon X Gates: New School Information Gathering," 2 pages, Mar. 2, 2009, retrieved from Internet Archive Wayback Machine https://web.archive.org/web/20090302045813/vimeo.com//2745624 on Aug. 13, 2024.
Gates, C., "Toorcon X Gates: New School Information Gathering," available at http://vimeo.com/2745624, 2 pages, retrieved on Aug. 13, 2024.
Khalil, J. et al., "Discovering Malicious Domains through Passive DNS Data Graph Analysis," Conference Paper, (Jun. 2016), 13 pages.
Knowles, D. et al., "W32.Blaster. Worm: Technical Details" webpage http://www.symantec.com/security_response/writeup.jsp?docid=2003-081113-0229-99&tabid=2, 3 pages, May 3, 2007, retrieved from Internet Archive Wayback Machine https://web.archive.org/web/20070503023514/http://www.symantec.com/security_response/writeup.jsp?docid=2003-081113-0229-99&tabid=2 on Aug. 16, 2024.
Levy, E., "The Making of a Spam Zombie Army," IEEE Computer & Security (2003), pp. 58-59.
Long, J., "Google Hacking for Penetration Testers," 170 pages, Jan. 31, 2006, retrieved from Internet Archive Wayback Machine, https://web.archive.org/web/20060131095431/http://www.blackhat.com/presentations/bh-europe-05/BH_EU_05-Long.pdf on Aug. 30, 2024.
Martorella, C., "A fresh new look into Information Gathering," 68 pages, Dec. 29, 2009 retrieved from Internet Archive Wayback Machine, https://web.archive.org/web/20091229020339/http://www.edgesecurity.com/docs/OWASP-Christian_Martorella-InformationGathering.pdf on Aug. 30, 2024.
Matta Security Limited, "An Introduction to Internet Attack & Penetration," available at http:/www.trustmatta.com/downloads/pdf/, Matta_Attack_and_Penetration_Introduction.pdf, (2001-2002), 14 pages.
McNab, C., "Network Security Assessment," O'Reilly Media, Inc., Second Edition, (2008), 506 pages.

(56) References Cited

OTHER PUBLICATIONS

Moore & Valsmith, et al., "Tactical Exploitation," 37 pages, Feb. 8, 2010, retrieved from Internet Archive Wayback Machine https://web.archive.org/web/20100208161237/https:/www.blackhat.com/presentations/bh-usa-07/Moore_and_Valsmith/Whitepaper/bh-usa-07-moore_and_valsmith-WP.pdf.

Nessus, "Documentation," webpage http://www.nessus.org/documentation/, 2 pages, Feb. 19, 2007, retrieved from Internet Archive Wayback Machine https://web.archive.org/web/20070219213924/http://www.nessus.org/documentation/ on Aug. 16, 2024.

Nessus, "Plugins: Symantec Anti Virus Corporate Edition Check," webpage http://www.nessus.org/plugins/index.php?view=single&id=21725, 2 pages, Feb. 22, 2007, retrieved from Internet Archive Wayback Machine https://web.archive.org/web/20070222133717/http://www.nessus.org/plugins/index.php?view=single&id=21725 on Aug. 13, 2024.

Nessus, "Plugins: The remote host is infected by a virus", webpage http://www.nessus.org/plugins/index.php?view=single&id=11329, 2 pages, Feb. 22, 2007, retrieved from Internet Archive Wayback Machine https://web.archive.org/web/20070222091638/http://www.nessus.org/plugins/index.php?view=single&id=11329 on Aug. 13, 2024.

Nessus, "Plugins: The remote host is infected by msblast.exe", webpage http://www.nessus.org/plugins/index.php?view=single&id=11818, 1 page, Sep. 24, 2006, retrieved from Internet Archive Wayback Machine https://web.archive.org/web/20060924205758/http://www.nessus.org/plugins/index.php?view=single&id=11818 on Aug. 13, 2024.

Prosecution History for U.S. Pat. No. 10,805,331, 1060 pages.
Prosecution History for U.S. Pat. No. 11,652,834, 344 pages.
Prosecution History for U.S. Pat. No. 11,777,976, 651 pages.
Prosecution History for U.S. Pat. No. 9,438,615, 232 pages.
Prosecution History for U.S. Pat. No. 9,973,524, 424 pages.

Representative Sample. Julie Young, Investopedia. Published Apr. 10, 2019 (Web Archive Aug. 19, 2019). Accessed on Aug. 19, 2024. [https://web.archive.org/web/20190819095403/https://www.investopedia.com/terms/r/representative-sample.asp].

Social-Engineer, LLC, "Social Engineering Using Maltego," webpage <www.youtube.com/watch?v=qiv4-wy3mxo>, 2 pages, Sep. 14, 2009, retrieved on Aug. 13, 2024.

Social-Engineer, LLC, Screen captures from "Social Engineering Using Maltego," webpage <www.youtube.com/watch?v=qiv4-wy3mxo>, 43 pages, Sep. 14, 2009.

Stoneburner, G. et al., "Risk Management Guide for Information Technology Systems," NIST, available at https://www.archives.gov/files/era/recompete/sp800-30.pdf, (Jul. 2002), 55 pages.

Tenable Network Security, Inc., "Nessus 3.0 Client Guide," available at http://nessus.org/documentation/nessus_3.0_client_guide.pdf, Mar. 6, 2007, 32 pages.

\* cited by examiner

| | | | | | | | Cyber Resilience Rating (CRx) | | | | | | |
|---|---|---|---|---|---|---|---|---|---|---|---|---|---|
| (L0) Ratings 102 | | | | | Security Score | | | | | | | | Risk |
| (L1) Factors 104 | | | Governance | | | | | | Fortitude | | | | |
| (L2) Subfactors 106 | Culture | Strategy | Resources | Third-Party | Ent. Risk Loss Exp. Mgmt | Red Teaming | | Protection | | | Detection/ Response | | Loss Exceedance Curves |
| (L3) Capabilities 108 | Behavior | Type | Process | Inventory | Insurance & Capital | Type | Application Software Security | Identity and Access Management | | | Logging | | |
| | Communications | Drivers | Priorities | Onboarding | | Scope | Asset Inventory | Network Protection | | | Monitoring and Alerting | | |
| | Conformity | Regulatory Alignment | | Risk-based Approach | | Frequency | Boundary Defense | Secure Network Device Configuration | | | BCP and Data Recovery | | |
| | Understanding | Policy and Standards | | Due Diligence | | Operator | Browser Security | Secure Server Configuration | | | Incident Response and Management | | |
| | Conduct | Issues/ Findings | | Continuous Monitoring | | | Data Protection | Secure Workstation Configuration | | | | | |
| | Roles & Responsibilities | | | Oversight | | | Email Security | Vulnerability Management | | | | | |
| | Security Awareness Training | | | Incident Response & Recovery | | | | | | | | | |
| | | | | Roles & Responsibilities | | | | | | | | | |
| (L4) Indicators 110 | Indicators | | | | | | | | | | | | |
| (L5) Signals 112 | Signal Values | | | | | | | | | | | | |
| | Artifacts | | | | | | | | | | | | |
| | Collection tools | | | | | | | | | | | | |

| | Threat | | | |
|---|---|---|---|---|
| Attack Vectors | Malicious Activity | Precursor Attack Data | Adversarial Threats | |
| Phishing Campaigns | Compromised assets | Credentials | Sophistication Level | |
| Extortion | Suspicious traffic and anonymous activity | Intellectual Property | Attack Methods | |
| Attacker Requests for Help | Brand abuse | Customer Data | | |
| Recruitment Attempts from Insiders | | Technical Information | | |

(L0) Ratings 102
(L1) Factors 104
(L2) Subfactors 106
(L3) Capabilities 108

100b

SYSTEMS AND METHODS FOR ASSESSMENT OF CYBER RESILIENCE

CROSS-REFERENCE TO RELATED APPLICATION(S)

This application claims the benefit of and priority to U.S. Provisional Application No. 63/305,082, filed on Jan. 31, 2022, entitled "SYSTEMS AND METHODS FOR ASSESSMENT OF CYBER RESILIENCE," which is hereby incorporated by reference herein in its entirety.

TECHNICAL FIELD

The following disclosure is directed to methods and systems for cybersecurity assessment, more specifically, methods and systems for assessment of cyber resilience for an entity and for affiliates having relationships with the entity.

BACKGROUND

Assessment of cybersecurity states of businesses, corporations, organizations, and other 'entities' can involve identifying and monitoring risks (e.g., threats) impacting cyber assets corresponding to each of the respective entities. Further, entities often outsource tasks to third parties. As a result, such entities have relationships with (e.g., are 'related to' or 'connected to') numerous third party affiliates (i.e., vendors). An entity's cyber assets and the entity's relationships can thus leave the entity vulnerable to risks, which can be difficult to monitor and evaluate across multiple axes of measurement. Accordingly, entities may desire methods and systems for evaluating their cybersecurity, threat profile, policies and procedures for controlling cyber assets, and mitigation capabilities.

SUMMARY

This methods and systems described herein provide an approach for assessing an entity's cyber resilience across various axes of measurement. Cyber resilience as described herein may generally refer to the current cyber security state of an entity, the entity's threat profile, the policies and procedures for controlling cyber assets controlled and/or managed by the entity, and mitigation capabilities for mitigating and minimizing risk impacts. For example, an entity's cyber resilience can be quantified as an amount of threat activity the entity faces, which may also be measured relative to an entity's industry and peer entity group(s), the effectiveness of the entity's security controls and posture, the existence and effectiveness of the entity's security governance processes, and/or a risk magnitude and frequency of expected losses based on a combination of the previous factors. These factors may be used to assess one or more entities (including "affiliated entities" or "affiliates"), resulting in an accurate and measurable analysis of the cyber resilience of the entities. These factors may also be used as inputs to further analyze cyber risk across various use cases such as credit analysis, insurance underwriting, or the cyber impact of mergers and acquisitions, amongst others. The factors can be expressed as a single indicator (e.g., value) for purposes of benchmarking in order to establish a data set for comparative analysis between entities. Based on the value of these summary indicators potentially changing as a corpus of assessed entities grows, several different summary scoring options may be used.

The assessment methodology described herein may be deployed as a stand-alone assessment of critical aspects of an entity's overall cyber security posture or, in some cases, combined with other assessments. The assessment methodology may be used to inform organizational leadership, financial intermediaries, investors, partners, and other interested parties of an entity's cybersecurity profile and capabilities. The methodological results may be temporal, as the nature of cybersecurity threats and control posture can vary over time. As such, the value and confidence in the assessment results may diminish over time, in which case periodic (e.g., monthly, quarterly) updates are recommended in the intervening period prior to a re-issuance (e.g., annual re-issuance) of the assessment results in order to account for any changes that may have occurred over time.

Some of the assessment measures described herein may be absolute, based in part on best practices and activities positively correlated with good security, and other measures may be scored in a relative fashion compared to a cohort of peer scores. As a result, the goal for some entities may not be to achieve the highest score in each category, even though such a score may be possible. Industry-specific benchmarking can help guide entities to the individual selection of the most appropriate and/or efficient goals.

In one aspect, the subject matter described herein relates to a computer-implemented method for providing a cyber resilience rating for an entity of a plurality of entities. the method can include obtaining a plurality of entity indicators corresponding to the plurality of entities, wherein each of the plurality of entity indicators include characteristic information for a respective entity of the plurality of entities, and wherein each of the plurality of entities correspond to a respective entity indicator of the plurality of entity indicators. The method can include determining a peer group for the entity based on the respective characteristic information for the entity, wherein the peer group includes a subset of the plurality of entities. The method can include obtaining a plurality of loss event records for the peer group, wherein each loss event record includes a respective loss value and corresponds to a cyber event associated with a respective entity of the peer group, wherein respective groups of loss event records selected from the plurality of loss event records correspond to a data disclosure type, a business interruption type, and a fraud type. The method can include executing, for each group of loss event records, a plurality of Monte Carlo simulations to generate respective loss simulation data based on the respective loss values of the loss event records included in the group and results for a cyber security assessment of the entity. The method can include identifying, based on the respective loss simulation data for each group of loss event records, an expected probability value corresponding to a materiality loss value of the entity. The method can include providing a risk factor score indicative of a cyber security risk of the entity based on the identified expected probability value. The method can include providing a cyber resilience rating for the entity based on a combination of the risk factor score, a fortitude factor score, and a governance factor score, wherein the fortitude factor score is indicative of a cyber security control posture of the entity, and wherein the governance factor score is indicative of an administration of cyber security controls by the entity.

Various embodiments of the method can include one or more of the following features. The characteristic information can include an industry indicator, geography indicator, and size indicator for the respective entity. Determining the peer group for the entity based on the respective entity characteristics of the entity can further include: selecting, from the plurality of entities, a subset of the plurality of entities for inclusion in the peer group based on the respective characteristic information corresponding to each entity of the subset of the plurality of entities including at least one of: the industry indicator, geography indicator, and size indicator corresponding to the entity. The peer group can include a first peer group and a second peer group, wherein the first peer group and the second peer group comprise different subsets of the plurality of entities. Each loss event record of the plurality of loss event records can include a respective loss event type corresponding to one of: the data disclosure type, the business interruption type, or the fraud type. The method can further include selecting the respective groups of loss event records from the plurality of loss event records based on the respective loss event type of each loss event record included in the respective groups of loss event records. The data disclosure type can correspond to at least one of: a data breach; a data theft; a data loss; and an unintentional data disclosure. The business interruption type can correspond to at least one of: a cyber extortion event; a network disruption; and a website disruption. The fraud type can correspond to at least one of: an identity fraud event; a phishing event; and a skimming event.

Executing, for each group of loss event records, the plurality of Monte Carlo simulations to generate the respective loss simulation data can include: determining a statistic from the respective loss values of the loss event records included in the group; weighting the statistic based on the results for the cyber security assessment of the entity to determine a weighted statistics; and executing the plurality of Monte Carlo simulations based on the weighted statistic. The cyber security assessment can include an outside-in cyber security assessment or an inside-out cyber security assessment. The materiality loss value can be based on an industry indicator corresponding to the entity and a revenue corresponding to the entity. The method can further include determining a respective materiality ratio for each respective loss simulation data, wherein the each of the respective materiality ratios are based on the loss materiality value corresponding to the entity; and selecting the respective loss simulation data corresponding to a largest materiality ratio of the materiality ratios. Identifying the expected probability value corresponding to the materiality loss value of the entity can include: generating a loss exceedance curve indicative of a probability of loss potential for the entity based on the selected loss simulation data; and identifying, from the loss exceedance curve, the expected probability value corresponding to the materiality loss value of the entity. The method can further include: obtaining signal data indicative of a cyber resilience of the entity; generating, based on a first subset of the signal data, the fortitude factor score, wherein the first subset of the signal data is indicative of the cyber security control posture of the entity; and generating, based on a second subset of the signal data, the governance factor score, wherein the second subset of the signal data is indicative of the administration of cyber security controls by the entity.

Other aspects of the invention comprise systems implemented in various combinations of computing hardware and software to achieve the methods described herein.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1A depicts an exemplary diagram of a hierarchical model for cyber resilience assessment, according to some embodiments;

FIG. 1B depicts an exemplary diagram of a hierarchical model for cyber resilience assessment, according to some embodiments;

DETAILED DESCRIPTION

Figure 2:
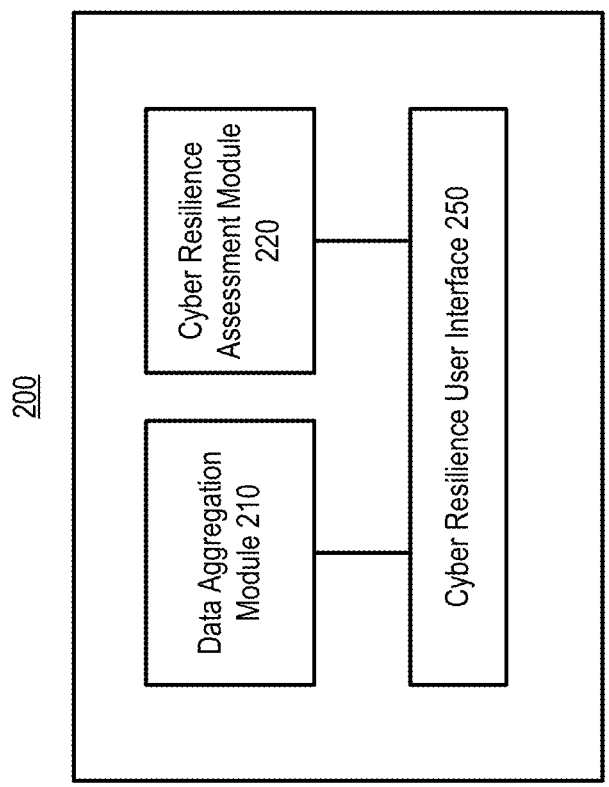
FIG. 2 depicts a block diagram of a cybersecurity resilience assessment system, according to some embodiments.

The present disclosure is directed to methods and systems for cybersecurity assessment, more specifically, methods and systems for assessment of cyber resilience for an entity and for affiliates having relationships with the entity. The assessment methodology for assessment of cyber resilience may be based on one or more factors, including (i) an entity's threat profile (referred to a "threat" factor), control posture (referred to as a "fortitude" factor), security oversight (referred to as a "governance" factor), and a degree to which an assessed entity can adequately mitigate cyber events to reduce the financial impact if and when such events were to occur (referred to as a "risk" factor). Cyber events as described herein may also be referred to as "cyber loss events" and/or "loss events".

The fortitude and governance factors as described herein can indicate the extent to which an entity can improve its ability to prevent cyber events and mitigate impact corresponding to the cyber events. Indicators (e.g., ratings or scores) of the fortitude and governance factors, combined with an indicator of an assessed ability to manage recovery in response to a cyber event (e.g., attack) as a result of investments in security incident and crisis response, third-party oversight, and culture, can form a "cyber security score" (also referred to as a "cyber security rating"). These security control and governance activities can result in reductions in potential frequency and losses (e.g., financial losses) as indicated by the risk factor. In addition, an entity's threat profile may be measured based on a variety of factors, such as the entity's business profile and actual targeting by threats based on obtained threat intelligence data. Assessments of the fortitude, governance, and risk factors can be combined and summarized into an individual quantitative output indicator referred to herein as a "cyber resilience rating" or "CRx". In some cases, rating scales for the cyber resilience rating can require a minimum number of participating entities to enable sufficient historical analysis.

of cybersecurity threats to an entity, and constitute specific implementations of solutions to problems that arise when attempting to monitor and mitigate the cybersecurity risks faced by an entity. Thus, the improved cybersecurity assessment and mitigation techniques described herein constitute improvements to computer-related technology for reasons similar to those articulated by the Federal Circuit in Finjan, Inc. v. Blue Coat Systems, Inc. (Fed. Cir. 2018), among other reasons, and are not abstract ideas.

In some embodiments, the assessment methodology used by the methods and system described herein may be based on the terminology as described in Table 1.

TABLE 1

| Terminology for Assessment Methodology | |
|---|---|
| Threat factor | Indicates a current state of threat activity facing an entity |
| | Examples of threat activity includes active attempts and plots found in underground forums where cyber criminals converge and evidence of Nation State attacks |
| Governance factor | Indicates an entity's oversight and administration of cyber security protocols and practices |
| | Examples of subfactors of governance include budgeting, resource management, strategy, and culture |
| Fortitude factor | Indicates an ability of an entity to present a strong security posture to the entity's threat communities, including measures of an entity's defensive capabilities and ability to remain resilient when the entity is unable to thwart an attack. |
| | The fortitude factor can include an evaluation of an entity's computing (e.g., cloud) infrastructure and visibility of the affiliates of the entity (e.g., the entity's supply chain) |
| Risk factor | Indicates the materiality of an event corresponding to an extreme or worse-case cyber incident. |
| Cyber Resilience Rating | Refers to an quantitative output indicative of an entity's cyber resilience |
| | The quantitative output may be based on the entirety of the various assessments described herein, examples of which are described with respect to "Exemplary Scoring for a Cyber Resilience Rating" |
| Posture | Refers to a measure of attack surface management and a state of an entity's cyber asset over a period of time |
| Exposure | Refers to a potential (e.g., probability) that an entity's asset(s) have vulnerabilities at a given time |
| Loss Exposure | Refers to a potential economic (e.g., financial) impact of a cyber incident |
| Extreme | Refers to a value taken from a loss distribution at the median value plus one standard deviation |
| Tail event | A value taken from a loss distribution at the $95^{th}$ percentile |
| Entity | Refers to the organization that is under evaluation using the assessment methodology described herein |
| Data Disclosure | Refers to utilization of information technology to make sensitive information known to unauthorized recipients |
| Fraud | Refers to wrongful or criminal use of information technology intended to result in financial or personal gain |
| Business Interruption | Refers to cessation or degradation of an entity's operations based on cyber asset (e.g., information technology asset) failures or hacking |

In some embodiments, the assessment methodology described herein can provide a comprehensive set of results that reflects the cumulative nature of an entity's security posture tempered by cyber events (e.g., attacks and incidents) that the entity has historically experienced and will likely experience in the future. Individual components of assessment methodology can be decoupled from the generated results and can provide decomposed insights relevant to specific consumers including, for example, Chief Information Security Officers (CISOs), Chief Risk Officers (CROs), Board Directors, internal audit, credit analysts, insurance underwriters, and others.

The methods and related systems disclosed herein provide for significant improvements in assessment and mitigation In some embodiments, a combination of the indicators for governance and fortitude factors may represent a cyber security score for the entity, which may be independent of the entity's ability to withstand cyber events. A combination of the indicators for governance, fortitude, and risk factors may indicate the entity's ability to withstand such cyber events. Analysis used for the assessment methodology described herein may be decomposed into several scoring components that form a hierarchical model for evaluating cyber resilience and generating the cyber resilience rating for an entity. Exemplary levels, naming conventions, and examples for each level for the hierarchical model are described by Table 2.

TABLE 2

Hierarchical Model for Assessment Methodology

| Level | Name | Examples |
|---|---|---|
| L0 | Future Use | Proposed approaches described with respect to "Exemplary Scoring for a Cyber Resilience Rating" |
| L1 | Factors | Threat, Fortitude, Risk, Governance |
| L2 | Subfactors | Culture, Detection, Loss Exceedance Curves |
| L3 | Capabilities | Behavior, Inventory, Boundary Defense |
| L4 | Indicators | The vulnerability scans coverage of domain controllers is sufficient<br>The authenticated vulnerability scans coverage of workstations is sufficient |
| L5 | Signals | a ratio of an amount of an entity's domain controllers including vulnerabilities to a total number of the entity's domain controllers<br>a ratio of an amount of an entity's workstations including vulnerabilities to a total number of an entity's workstations |

The levels, naming conventions, and examples for each level for the hierarchical model shown in Table 2 are examples and may be supplemented, modified, and/or removed. The levels described with respect to Table 2 may be connected based on a number of relationships. Level L0 may include one or more ratings each corresponding to one or more factors. Level L1 may include the threat, fortitude, risk, and governance factors described herein, where each factor corresponds to one or more subfactors. Level L2 may include one or more subfactors each corresponding to one or more capabilities Level L3 may include one or more capabilities each corresponding to an indicator of the respective capabilities. Level L4 may include one or more indicators each corresponding to an obtained signal. Level L5 may include one or more obtained signals. FIGS. 1A and 1B depict exemplary diagrams 100a and 100b, respectively, of a hierarchical model for cyber resilience assessment, according to some embodiments. As shown in the diagrams 100a and 100b, the hierarchical model for the cyber resilience assessment methodology may include levels L0-L5, where level L0 is a top level of the hierarchy and level L5 is a bottom level of the hierarchy. Level L0 may correspond to one or more ratings 102, including the cyber resilience rating and cyber security score described herein. Each of the ratings 102 may be based on the levels included under the level L0 corresponding to the ratings 102. For example, the cyber resilience rating may be based on the governance, fortitude and risk factors, while the cyber security rating may be based on only the governance and fortitude factors. The cyber resilience rating and the cyber security score may not be based on the threat factor as described with respect to the diagram 100b.

As shown in FIGS. 1A and 1B, the level L1 may include one or more factors 104, including threat, fortitude, risk, and governance factors described herein. Each factor 104 may be based on one or more subfactors 106 corresponding to the level L2. For example, the governance factor may be based on subfactors 106 for culture, strategy, resources, third-party affiliates, enterprise risk loss exposure management, and penetration testing and red team exercises relating to cyber security practices for an entity under evaluation via the assessment methodology described herein. The subfactors 106 described in the diagrams 100a and 100b may be exemplary and other subfactors 106 may correspond to each factor 104. Each subfactor 106 may be based on one or more capabilities 108 corresponding to the level L3. For example, the culture subfactor may be based on capabilities 108 for behavior, communications, conformity, understanding, conduct, roles and responsibilities, and cyber security training awareness relating to cyber security practices for an entity under evaluation via the assessment methodology described herein. The capabilities 108 described in the diagrams 100a and 100b may be exemplary and other capabilities 108 may correspond to each subfactor 106.

In some embodiments, each capability 108 may be derived from one or more indicators 110 corresponding to the level L4. The indicators 110 may provide information for each of the capabilities 108. The indicators 110 may be derived from signals 112 corresponding to the level L5. Examples of signals 112 from which the indicators 110 may be derived include signal values, artifacts, and collection tools. Signals 112 may include cyber security information obtained for the entity under evaluation, including cyber security threat, event, and incident information and characteristics of the entity. Signals 112 may include and/or otherwise be derived from internally-observed and/or externally-observed cyber security threat, event, and/or incident information and characteristics of the entity. In some cases, signals 112 may include characteristics of entities that may be evaluated using a cyber resilience assessment tool as described herein, including information indicative of industries of each of the entities, geographical locations (e.g., geographical locations of headquarters) of each of the entities, and size. A size of an entity may be indicated by the entity's annual revenue, number of employees, and/or by another metric.

As used herein, an "affiliate" of a particular entity may be any individual, organization, corporation and/or other entity that interacts with, provides services to, and/or otherwise has a relationship to or with the particular entity.

As used herein, the "criticality" of an entity's relationship to an affiliate may be a measurement or characterization of the extent to which the entity's well-being (e.g., operational integrity, health, reputation, financial position, security state, etc.) is sensitive to (e.g., dependent on) the affiliate's well-being, the frequency of such interactions, the volume of data exchanged between the entity and any given affiliate, and/or the sensitivity of such data.

An entity may monitor the security status (e.g., security ratings, security events, etc.) of one or more of the entity's affiliates. The monitored affiliates may be referred to herein as the entity's "portfolio" of affiliates. An entity's portfolio may include any number of the entity's affiliates (e.g., one or more, dozens, hundreds, thousands, etc.).

"Characteristics" of an entity (e.g., an affiliate or other entity) may include, without limitation, size (e.g., the number of employees or other members of the entity, the entity's market capitalization or annual revenues, etc.); the business sector (e.g., industry, sub-industry, etc.) in which the entity operates (e.g., legal services, technology, finance, etc.); age; rate of growth; North American Industry Classification System (NAICS) code; Standard Industrial Classification (SIC) code; a number of services provided by the entity; a security rating (e.g., as provided by BitSight Technologies, Inc. of Boston, Massachusetts, USA); a geographical location of the entity; a location of the entity based on one or more IP addresses associated with the entity (e.g., "geo IP" footprint); a number of Internet Protocol (IP) addresses associated with the entity; the technology used by the entity (e.g., server software, user software, etc.); one or more security risk types of an entity; and/or known competitors or entities similar to the particular entity based on the web activity of the entity. Values for one or more of the above-listed entity characteristics may be provided by the entity itself, obtained from third party sources (e.g., a firmographics data source, data from BuiltWith® Pty Ltd), and/or collected or extracted from publicly available information. In some embodiments, the values for one or more entity characteristics can be stored in a database.

A "security profile" of an entity may reflect the past, present, and/or future security characteristics of an entity. In some embodiments, the security profile may reflect security risks to which the entity is exposed balanced by the countermeasures that the entity has taken or can take to mitigate the security risk. As referred to herein, a security profile of an entity can include a "security rating" (e.g., "security score") for the entity. A security rating may be quantitative or qualitative. For example, a quantitative security rating may be expressed as a number within a predetermined range (e.g., between 250 and 900, as provided by BitSight Technologies, Inc. of Boston, Massachusetts, USA). Some non-limiting examples of techniques for determining security ratings of entities are described in U.S. patent application Ser. Nos. 16/802,232, 13/240,572, 15/142,677, and 16/514,771.

As used herein, "monitoring" an affiliate may refer to determining (e.g., obtaining) a security rating of the affiliate from time to time, identifying one or more activities or events relevant to the affiliate's security profile, etc. Some non-limiting examples of techniques for determining security ratings of entities are described in U.S. patent application Ser. Nos. 16/802,232, 13/240,572, 15/142,677, and 16/514,771.

Some Embodiments of Cyber Resilience Assessment

To evaluate and assess an entity's cyber resilience based on the cyber resilience rating and factors (e.g., factors 102) described herein, a cyber resilience assessment tool including assessment methodology of the hierarchical model described herein may be needed. Referring to FIG. 2, an example of a cyber resilience assessment tool 200 is shown. In some embodiments, the cyber resilience assessment tool 200 may provide assessments of an entity's cyber resilience and cyber resilience of an entity's affiliates. Assessments of cyber resilience may include a cyber resilience rating and/or a cyber security score as described herein. Cyber resilience ratings and cyber security score may be derived from data obtained by a cybersecurity monitoring system. In some embodiments, the cyber resilience assessment tool 200 may be included with a cybersecurity monitoring system of a risk management service provider. Some non-limiting examples of cybersecurity monitoring systems are described in U.S. patent application Ser. Nos. 16/802,232, 13/240,572, 15/142,677, and 16/514,771. In some embodiments, the cyber resilience assessment tool 200 may be communicatively coupled to one or more third-party computing systems.

Some embodiments of a cyber resilience assessment tool 200 are described below. In some embodiments, the cyber resilience assessment tool 200 may include a data aggregation module 210, a cyber resilience assessment module 220, and a cyber resilience user interface 250. The data aggregation module 210 may obtain signals (e.g., signals 112) from one or more computing systems connected to the cyber resilience assessment tool 200. The signals may include internally-observable and/or externally observable cyber security information corresponding to an entity under evaluation by the cyber resilience assessment tool 200. Internally-observable cyber security information may be derived from an entity's computing systems, computing assets, and/or cyber protocols and practice. Externally-observable cyber security information may be derived from third-party entities that observe and monitor an entity's computing systems, computing assets, and/or cyber protocols and practice. Examples of signals obtained by the data aggregation module 210 can include:

an amount of capital investment in the security of the entity;
a measure of employee training in the security of the entity;
a measure of organization of entity personnel dedicated to information security;
an amount of the entity's budget dedicated to information security;
a number and/or severity of botnet infection instances of a computer system associated with the entity;
a number of spam propagation instances originating from a computer network associated with the entity;
a number of malware servers associated with the entity;
a number of potentially exploited devices associated with the entity;
a number of hosts authorized to send emails on behalf of each domain associated with the entity;
a determination of whether a DomainKeys Identified Mail (DKIM) record exists for each domain associated with the entity and/or a key length of a public key associated with a Domain Name System (DNS) record of each domain associated with the entity;
an evaluation of a Secure Sockets Layer (SSL) certificate and/or a Transport Layer Security (TLS) certificate associated with a computer system of the entity;
a number and/or type of service of open ports of a computer network associated with the entity;
an evaluation of security-related fields of a header section of HTTP response messages of hosts associated with the entity;
a rate at which vulnerabilities are patched in a computer network associated with the entity;
an evaluation of file sharing traffic originating from a computer network associated with the entity; and/or
a number of lost records and/or sensitivity of information in the lost records in a data breach of a computer system associated with the entity.

In some embodiments, signals may be provided to the cyber resilience assessment tool 200 via the cyber resilience user interface 250. For example, information security administrators corresponding to an entity under evaluation may provide characteristics corresponding to the entity at the cyber resilience user interface 250. The data aggregation module 210 may continuously and/or periodically obtain signal data based on an availability of the signal data from internal and/or external data sources.

In some embodiments, the cyber resilience assessment tool 200 may include a cyber resilience assessment module 220. The cyber resilience assessment module 220 may receive data aggregated by the data aggregation module and may generate cyber resilience assessments for one or entities and/or affiliates of the entities. Cyber resilience assessments may include a cyber resilience rating and/or a cyber security score as described herein. The cyber resilience assessment module 220 may generate cyber resilience assessments including cyber resilience ratings based on the assessment methodology and methods described herein with respect to "Exemplary Scoring for a Cyber Resilience Rating". The cyber resilience assessment module 220 may utilize the scoring methodology for the governance, fortitude, and risk factors as described below.

In some embodiments, the cyber resilience assessment tool 200 may be implemented as software executed on one or more computer systems 400. For example, the cyber resilience assessment tool 200 may be implemented as software executed on an entity's computer systems or a third party entity's computer systems, where the third party entity (e.g., risk management service provider) provides services to the entity. In some embodiments, the cyber resilience assessment tool 200 may provide a cyber resilience user interface 250. The cyber resilience user interface 250 may present (e.g., display) generated cyber resilience assessments and may selection and analysis of individual components (e.g., factors 104, subfactors 106, capabilities 108, indicators 110, and/or signals 112) of generated cyber resilience assessments for entities.

In some embodiments, the cyber resilience user interface 250 may provide interactive components whereby a user may interact with the data aggregation module 210 and/or the cyber resilience assessment module 220. For example, by interacting with the cyber resilience user interface 250, the user may modify data sources from which data is obtained by the data aggregation module 210 and may review and analyze generated cyber resilience assessments generated by the cyber resilience assessment module 220.

Some embodiments of assessment methods and methodology for generating cyber resilience assessments are described in further detail below. In addition, some embodiments of a method 300 for providing a cyber resilience rating are described below.

Exemplary Scoring for a Governance Factor

In some embodiments, the cyber risk assessment module 220 may generate scoring for factors of a cyber resilience rating and/or a cyber security score. In some cases, the cyber risk assessment module 220 may generate a score for a governance factor. The governance factor may provide an indication of management of an entity's cyber security organization. Managing an entity's cyber security organization can require aligning the entity's cyber security culture, strategy, resources, third party affiliates, risk management, and penetration testing in furtherance of the business goals and objectives of entity. Such subfactors as described herein can be encapsulated in a generated governance score. In some embodiments, the governance factor may be scored on a 0-100 scale and is evaluated according to a rubric for the subfactors (e.g., subfactors 106) of the governance factor as shown in Table 3. In some cases, the governance factor may be measured and weighted using various gradients and scales different from those described in Table 3.

TABLE 3

Governance Factor Scoring Methodology

| Subfactor | Possible Points | Weight |
|---|---|---|
| Culture | 0-100 | (100/6)% |
| Strategy | 0-100 | (100/6)% |
| Resources | 0-100 | (100/6)% |
| Third Party Affiliates | 0-100 | (100/6)% |
| Enterprise Risk Loss Exposure Management | 0-100 | (100/6)% |
| Penetration Testing and Red Team Exercises | 0-100 | (100/6)% |

As shown in Table 3, in this particular embodiment, each of the subfactors (e.g., subfactors 106) may be scored on a scale of 0-100, multiplied by a respective weight, and summed to produce a score for the governance factor as described by Equation 1.

$$\text{Governance Factor Score} = \sum_{x=1}^{6} \text{Subfactor}_x * \text{Weight}_x \quad (1)$$

In this particular embodiment, each subfactor may be weighted evenly. In other embodiments, the weights may be altered to address entity-specific and/or industry-specific needs. The governance factor may be scored based on a weighted combination of the subfactors for culture, strategy, resources, third-party affiliates, enterprise risk loss exposure management, and penetration testing and red team exercises. Each individual subfactor may be scored independently as described below.

In some embodiments, a governance factor may include an entity's cyber security culture (referred to herein as "culture") as a subfactor. A score for an entity's culture subfactor may be based on one or more capabilities (e.g., capabilities 108). Examples of capabilities indicative of the culture subfactor are described in Table 4.

TABLE 4

Culture Subfactor Scoring Methodology

| Security Culture Capability | Points | Weight |
|---|---|---|
| Behavior | 0-100 | (100/7)% |
| Communications | 0-100 | (100/7)% |
| Conformity | 0-100 | (100/7)% |
| Understanding | 0-100 | (100/7)% |
| Conduct | 0-100 | (100/7)% |
| Roles and Responsibilities | 0-100 | (100/7)% |
| Security Awareness and Training | 0-100 | (100/7)% |

The capabilities for the culture subfactor as shown in Table 4 can assess to what extent security expectations are present throughout an evaluated entity's organizational culture. The culture subfactor may be assessed by a number of indicators (e.g., indicators 110) that quantify each of the capabilities described in Table 4. Indicators may be derived from signals (e.g., signals 112) as described herein for the cyber resilience assessment tool 200. In this particular embodiment, each of the capabilities may be scored on a scale of 0 to 100, multiplied by a respective weight, and then summed to produce a score for the culture subfactor as described by Equation 2.

$$\text{Culture Subfactor Score} = \sum_{x=1}^{7} \text{Capability}_x * \text{Weight}_x \quad (2)$$

In this particular embodiment, each capability may be weighted evenly. In other embodiments, the weights may be altered to address entity-specific and/or industry-specific needs.

In some embodiments, a governance factor may include an entity's cyber security strategy (referred to herein as "strategy") as a subfactor. The strategy subfactor can assess how well aligned the entity's cyber security organization is to the business served by the entity. A score for an entity's strategy subfactor may be based on one or more capabilities (e.g., capabilities 108). Examples of capabilities indicative of the strategy subfactor and criteria for each capability are described in Table 5.

TABLE 5

Strategy Subfactor Scoring Methodology

| Security Strategy Capability | Criteria | Points | Weight |
|---|---|---|---|
| Security Strategy Type | 1. No security strategy<br>2. Documented security strategy<br>3. Documented multiyear security strategy | 1. 0<br>2. 50<br>3. 100 | 20% |
| Security Strategy Drivers | 1. Security primarily driven by firefighting needs<br>2. Security primarily driven by audit and compliance<br>3. Security primarily driven by alignment with corporate strategy, inclusive of all necessary obligations<br>4. Security primarily driven by a balance of corporate strategy in line with cyber risk appetite | 1. 0<br>2. 25<br>3. 50<br>4. 100 | 20% |
| Regulatory Alignment | 1. Regulatory requirements are not known or heeded<br>2. Entity develops ad-hoc regulatory requirements<br>3. Regulatory requirements are integrated into security policy and strategy | 1. 0<br>2. 50<br>3. 100 | 20% |
| Policy and Standards | 1. No security policy and standards<br>2. Published security policy and standards<br>3. Security policy and standards are published and approved by business leaders | 1. 0<br>2. 50<br>3. 100 | 20% |
| Issues/ Findings Prioritization | 1. No issue/findings prioritization<br>2. Issues/findings prioritized by non-business stakeholders<br>3. Issues/findings prioritized to meet business and regulatory requirements | 1. 0<br>2. 50<br>3. 100 | 20% |

The strategy subfactor may be based on one or more capabilities and corresponding criteria as shown in Table 5. The highest level of performance for each capability may be the assigned score for the respective criteria corresponding to the entity for the respective capabilities, such that assigned scores are not cumulative for each categorical assessment of the criteria. The strategy subfactor may be assessed by a number of indicators (e.g., indicators 110) that map to one of the criteria for each of the capabilities described in Table 5. Indicators may be derived from signals (e.g., signals 112) as described herein for the cyber resilience assessment tool 200. In this particular embodiment, each of the capabilities may be scored on a scale of 0 to 100 based on the corresponding criteria of the entity corresponding to the respective capabilities, multiplied by a respective weight, and then summed to produce a score for the strategy subfactor as described by Equation 3.

$$\text{Strategy Subfactor Score} = \sum_{x=1}^{5} Capability_x * Weight_x \quad (3)$$

In this particular embodiment, each capability may be weighted evenly. In other embodiments, the weights may be altered to address entity-specific and/or industry-specific needs.

In some embodiments, a governance factor may include an entity's funding and/or available resources for cyber security (referred to herein as "resources") as a subfactor. A score for an entity's resources subfactor may be based on one or more capabilities (e.g., capabilities 108). A resources subfactor indicative of a well-funded security organization may be a prerequisite for adequate cyber security execution and subsequent risk management. A resources subfactor may indicate an entity's allocation of resources (e.g., funding) for cyber security functions. A resources subfactor may indicate which of the following groups of an entity receive resources for cyber security, including (but not limited to): Asset Management; Penetration Testing and Red Teaming; Identify and Access Management; IT/Cyber Risk Management; Networking and Telecommunications; Security/Business liaisons (BISOs); Security Operations; Security Technology and Architecture; Cloud Security; and Threat Intelligence. Examples of capabilities indicative of the resource subfactor and criteria for each capability are described in Table 6.

TABLE 6

Resource Subfactor Scoring Methodology

| Resource Capability | Criteria | Points | Weight |
|---|---|---|---|
| Budgeting Process | 1. Ad-hoc funding for security<br>2. Annual Security Budget<br>3. Multi-year Security budget | 1. 0<br>2. 50<br>3. 100 | 50% |
| Budget Priorities | Ten points for each area that is funded<br>1. Asset Management<br>2. Penetration Testing and Red Teaming<br>3. Identify and Access Management<br>4. IT/Cyber Risk Management<br>5. Networking and Telecommunications<br>6. Security/Business liaisons (BISOs)<br>7. Security Operations<br>8. Security Technology and Architecture<br>9. Cloud Security<br>10. Threat Intelligence | 0-100 | 50% |

The resources subfactor may be based on one or more capabilities and corresponding criteria as shown in Table 6. The resource subfactor may be assessed by a number of indicators (e.g., indicators 110) that map to one of the criteria for each of the capabilities described in Table 6. Indicators may be derived from signals (e.g., signals 112) as described herein for the cyber resilience assessment tool 200. In this particular embodiment, each of the capabilities may be scored on a scale of 0 to 100 based on the corresponding criteria of the entity, multiplied by a respective weight, and then summed to produce a score for the resources subfactor as described by Equation 4.

$$\text{Resources Subfactor Score} = \sum_{x=1}^{2} Capability_x * Weight_x \quad (4)$$

In this particular embodiment, each capability may be weighted evenly. In other embodiments, the weights may be altered to address entity-specific and/or industry-specific needs.

In some embodiments, a governance factor may include an entity's visibility and management of affiliates (e.g., supply chain providers, vendors, and/or third parties having relationships with the entity) of the entity (referred to herein as "third-party affiliates") as a subfactor. A score for an entity's third-party affiliates subfactor may be based on one or more capabilities (e.g., capabilities 108). Examples of capabilities indicative of the third-party affiliates subfactor and criteria for each capability are described in Table 7.

TABLE 7

Third-Party Affiliates Subfactor Scoring Methodology

| Third-Party Affiliates Capability | Points | Weight |
|---|---|---|
| Inventory | 0-100 | 12.5% |
| Onboarding | 0-100 | 12.5% |
| Risk-Based Approach | 0-100 | 12.5% |
| Due Diligence | 0-100 | 12.5% |
| Continuous Monitoring | 0-100 | 12.5% |
| Oversight | 0-100 | 12.5% |
| Incident Response and Recovery | 0-100 | 12.5% |
| Roles and Responsibilities | 0-100 | 12.5% |

The third-party affiliates subfactor may be assessed by a number of indicators (e.g., indicators 110) that quantify each of the capabilities described in Table 7. Indicators may be derived from signals (e.g., signals 112) as described herein for the cyber resilience assessment tool 200. The indicators may indicate the entity's performance for each capability and the capabilities may be cross-referenced to popular security and control frameworks. In this particular embodiment, each of the capabilities may be scored on a scale of 0 to 100, multiplied by a respective weight, and then summed to produce a score for the third-party affiliates subfactor as described by Equation 5.

$$\text{Third Party Affiliates Subfactor Score} = \sum_{x=1}^{8} Capability_x * Weight_x \quad (5)$$

In this particular embodiment, each capability may be weighted evenly. In other embodiments, the weights may be altered to address entity-specific and/or industry-specific needs.

In some embodiments, a governance factor may include an assessment of whether and/or to what extent an entity is capable of withstanding extreme and tail cyber loss events strategy (referred to herein as "enterprise risk loss exposure management" or "risk management") as a subfactor. For example, the enterprise risk loss exposure management subfactor may measure whether an entity has appropriate insurance coverage and/or if the entity conducts capital allocation or self-insurance exercises with specific cyber loss scenarios. A score for an entity's enterprise risk loss exposure management subfactor may be based on one or more criteria. Examples of criteria indicative of the enterprise risk loss exposure management subfactor are described in Table 8.

TABLE 8

Enterprise Risk Loss Exposure Management Subfactor Scoring Methodology

| Criteria | Score |
|---|---|
| No insurance or reserves | 0 |
| Reserves or insurance | 50 |
| Reserves and Insurance | 100 |

The enterprise risk loss exposure management subfactor may be assessed by a number of indicators (e.g., indicators 110) that indicate the criteria described in Table 8. Indicators may be derived from signals (e.g., signals 112) as described herein for the cyber resilience assessment tool 200. Based on the criteria shown in Table 8, a score may be produced for the enterprise risk loss exposure management subfactor as described by Equation 6.

$$\text{Risk Management Subfactor Score} = \text{Criteria Score} \quad (6)$$

In some embodiments, a governance factor may include an assessment of a degree to which an entity is engaged in mature penetration testing and red teaming activities to test their control environment and identify deficiencies (referred to herein as "penetration testing and red team exercises") as a subfactor. A score for an entity's penetration testing and red team exercises subfactor may be based on one or more capabilities (e.g., capabilities 108). Examples of capabilities indicative of the penetration testing and red team exercises subfactor and criteria for each capability are described in Table 9.

TABLE 9

Penetration Testing And Red Team Exercises Subfactor Scoring Methodology

| Capability | Criteria | Score | Weight |
|---|---|---|---|
| Type | 1. Entity does not perform a vulnerability or penetration test<br>2. Entity performs a basic vulnerability or penetration test<br>3. Entity performs a multi-layered attack simulation utilizing both social and technology attacks | 1. 0<br>2. 50<br>3. 100 | 25% |
| Scope | 1. Entity does not perform a vulnerability or penetration test<br>2. Limited scope/specific targets are designated out of scope (affecting mission/business objectives)<br>3. Broad scope (virtually nothing is off limits) | 1. 0<br>2. 50<br>3. 100 | 25% |
| Frequency | 1. Entity does not perform a vulnerability or penetration test<br>2. Conducted at least every other year<br>3. Conducted at least annually | 1. 0<br>2. 50<br>3. 100 | 25% |
| Operator | 1. Entity does not perform a vulnerability or penetration test<br>2. Conducted by internal staff only<br>3. Conducted by external staff<br>4. Conducted by a different external providers each time | 1. 0<br>2. 33<br>3. 66<br>4. 100 | 25% |

The penetration testing and red team exercises subfactor may be based on one or more capabilities and corresponding criteria as shown in Table 9. The penetration testing and red team exercises subfactor may be assessed by a number of indicators (e.g., indicators 110) that map to one of the criteria for each of the capabilities described in Table 9. Indicators may be derived from signals (e.g., signals 112) as described herein for the cyber resilience assessment tool 200. In this particular embodiment, each of the capabilities may be scored on a scale of 0 to 100 based on the corresponding criteria of the entity, multiplied by a respective weight, and then summed to produce a score for the penetration testing and red team exercises subfactor as described by Equation 7.

$$\text{Penetration Testing \& Red Teaming Subfactor Score} = \sum_{x=1}^{4} Capability_x * Weight_x \quad (7)$$

In this particular embodiment, each capability may be weighted evenly. In other embodiments, the weights may be altered to address entity-specific and/or industry-specific needs.

As described herein, the cyber resilience assessment tool 200 may determine the governance factor score based on a weighted sum of the individual scores for one or more subfactors, including culture, strategy, resources, third-party affiliates, enterprise risk loss exposure management, and penetration testing and red team exercises. In some embodiments, alternate scoring combinations to determine the score for the governance factor of the cyber resilience rating and the cyber security score may be used by the cyber resilience assessment tool 200.

Exemplary Scoring for a Fortitude Factor

In some cases, the cyber risk assessment module 220 may generate a score for a fortitude factor. The fortitude factor may provide an indication of an entity's security posture, including the entity's ability to prevent and withstand the impact of cyber events (e.g., incidents). An entity's security posture and assessed score for a fortitude factor may be based on subfactors including a protection, detection, and response subfactor. Such subfactors as described herein can be encapsulated in a generated fortitude score. In some embodiments, the fortitude factor may be scored on a 0-100 scale and is evaluated according to a rubric for the subfactors (e.g., subfactors 106) of the fortitude factor as shown in Table 10. The score for the fortitude factor may be weighted evenly between controls that affect loss events from occurring (e.g., as indicated by the protection factor) and controls that affect the amount of losses an entity might incur (e.g., as indicated by the detection and response factors). In some cases, the fortitude factor may be measured and weighted using various gradients and scales different from those described in Table 10.

TABLE 10

Fortitude Factor Scoring Methodology

| Subfactor | Possible Points | Weight |
|---|---|---|
| Protection | 0-100 | 50% |
| Detection/Response | 0-100 | 50% |

As shown in Table 10, in this particular embodiment, each of the subfactors (e.g., subfactors 106) may be scored on a scale of 0-100, multiplied by a respective weight, and summed to produce a score for the fortitude factor as described by Equation 8.

Fortitude Factor Score=
(Protection$_{Score}$*Protection$_{Weight}$)+(Detection Response$_{Score}$*Detection Response$_{Weight}$) (8)

In this particular embodiment, each subfactor may be weighted evenly. In other embodiments, the weights may be altered to address entity-specific and/or industry-specific needs. Each individual subfactor may be scored independently as described below.

In some embodiments, a fortitude factor may include an entity's protection controls (referred to herein as "protection") as a subfactor. An entity's protection controls may be represented by a number of control evaluations focused on technologies and practices that prevent an attacker or insider from initiating a data disclosure, fraud, and/or business interruption event. A score for an entity's protection subfactor may be based on one or more capabilities (e.g., capabilities 108). Examples of capabilities indicative of the protection subfactor are described in Table 11.

TABLE 11

Protection Subfactor Scoring Methodology

| Protection Capability | Points | Weight |
|---|---|---|
| Application Software Security | 1-100 | (100/12)% |
| Asset Inventory | 1-100 | (100/12)% |
| Boundary Defense | 1-100 | (100/12)% |
| Browser Security | 1-100 | (100/12)% |
| Data Protection | 1-100 | (100/12)% |
| Email Security | 1-100 | (100/12)% |
| Identity and Access Management | 1-100 | (100/12)% |
| Network Protection | 1-100 | (100/12)% |
| Secure Network Device Configuration | 1-100 | (100/12)% |
| Secure Server Configuration | 1-100 | (100/12)% |
| Secure Workstation Configuration | 1-100 | (100/12)% |
| Vulnerability Management | 1-100 | (100/12)% |

The protection subfactor may be based on one or more capabilities as shown in Table 11. The protection subfactor may be assessed by a number of indicators (e.g., indicators 110) that quantify each of the capabilities described in Table 11. Indicators may be derived from signals (e.g., signals 112) as described herein for the cyber resilience assessment tool 200. Each of the capabilities shown in Table 11 and the indicators mapped to the respective capabilities may be cross-referenced to popular security and control frameworks and practices. Each capability may have a series of control test indicators used to determine how well the entity is performing in the respective capability. In this particular embodiment, each of the capabilities may be scored on a scale of 0 to 100, multiplied by a respective weight, and then summed to produce a score for the protection subfactor as described by Equation 9.

$$\text{Protection Subfactor Score} = \sum_{x=1}^{12} Capability_x * Weight_x \qquad (9)$$

In this particular embodiment, each capability may be weighted evenly. In other embodiments, the weights may be altered to address entity-specific and/or industry-specific needs. Some or all of the indicators that are scored for each capability in Table 11 may be distributed via a Z-Score function and indexed to peer benchmarks, to allocate the point spread across the number of indicators being assessed.

In some embodiments, a fortitude factor may include an entity's detection controls and response controls (referred to herein as "detection and response") as a subfactor. An entity's detection controls may be represented by a number of control evaluations focused on technologies and practices that allow an entity to detect the actions of an individual (e.g., attacker or insider) as the individual perpetrates a data disclosure, fraud, and/or business interruption event. An entity's response controls may be represented by a number of control evaluations focused on technologies and practices that allow an entity to respond to the actions of an individual (e.g., attacker or insider) as the individual perpetrates a data disclosure, fraud, and/or business interruption event. A score for an entity's detection and response subfactor may be based on one or more capabilities (e.g., capabilities 108). Examples of capabilities indicative of the detection and response subfactor are described in Table 12.

TABLE 12

Detection and Response Subfactor Scoring Methodology

| Detection/Response Capability | Points | Weight |
|---|---|---|
| Logging | 0-100 | 25% |
| Monitoring and Alerting | 0-100 | 25% |
| Business Continuity Planning (BCP) and Data Recovery | 0-100 | 25% |
| Incident Response and Management | 0-100 | 25% |

The detection and response subfactor may be based on one or more capabilities as shown in Table 12. The detection and response subfactor may be assessed by a number of indicators (e.g., indicators 110) that quantify each of the capabilities described in Table 12. Indicators may be derived from signals (e.g., signals 112) as described herein for the cyber resilience assessment tool 200. Each of the capabilities shown in Table 12 and the indicators mapped to the respective capabilities may be cross-referenced to popular security and control frameworks and practices. Each capability may have a series of control test indicators used to determine how well the entity is performing in the respective capability. In this particular embodiment, each of the capabilities may be scored on a scale of 0 to 100, multiplied by a respective weight, and then summed to produce a score for the protection subfactor as described by Equation 10.

$$\text{Detection \& Response Subfactor Score} = \sum_{x=1}^{4} Capability_x * Weight_x \quad (10)$$

In this particular embodiment, each capability may be weighted evenly. In other embodiments, the weights may be altered to address entity-specific and/or industry-specific needs. Some or all of the indicators that are scored for each capability in Table 12 may be distributed via a Z-Score function and indexed to peer benchmarks, to allocate the point spread across the number of indicators being assessed. In some cases, the detection and response subfactor score may be assessed by outside-in and/or inside-out assessments for an entity.

As described herein, the cyber resilience assessment tool 200 may determine the fortitude factor score based on a weighted sum of the individual scores for one or more subfactors, including protection and detection and response. In some embodiments, alternate scoring combinations to determine the score for the fortitude factor of the cyber resilience rating and the cyber security score may be used by the cyber resilience assessment tool 200.

Exemplary Scoring for a Risk Factor and Peer Group Analysis

In some cases, the cyber risk assessment module 220 may generate a score for a risk factor. The risk factor may provide an indication of an entity's quantified cyber risk using cyber risk quantification (CRQ) methods (e.g., methods as articulated in the Open FAIR standards). A score for the risk factor may be assessed based producing an exceedance probability (EP) curve and related cyber loss simulation data that represents the entity's loss potential (e.g., economic and/or financial loss potential) and related probability of such loss potential. Each EP curve may include a continuous or discrete graph of loss values (also referred to as "loss amounts") plotted against respective probabilities that the entity's losses for a period of time (e.g., 1 year, 5 years, 10 years, etc.) exceed the loss values. Each EP curve may be generated based on estimated loss values corresponding to simulations of cyber loss events performed using Monte Carlo analysis. Executed simulations of cyber loss events and corresponding loss values for an entity based on Monte Carlo analysis may be referred to herein as "cyber loss simulation data". In some cases, the EP curve may also be referred to as a Loss Exceedance Curve (LEC). In some embodiments, the risk factor may be scored on a 0-10 scale and an intersection of the entity's materiality may be plotted on the probability axis of the EP curve and the entity's resultant EP value may be evaluated according to one of the rubrics (Option 1 or Option 2) as shown in Table 13. The EP value may be determined based on a probability corresponding to an entity's materiality value, where the materiality value may be equivalent to an entity's materiality threshold (e.g., as described with respect to Table 20) multiplied by the entity's gross revenue (e.g., annual gross revenue).

TABLE 13

Risk Factor Scoring Methodology

| EP Value | Score |
|---|---|
| *Option 1* | |
| >=0%-< 11% | 10 |
| >=11%-< 21% | 9 |
| >=21%-< 31% | 8 |
| >=31%-< 41% | 7 |
| >=41%-< 51% | 6 |
| >=51%-< 61% | 5 |
| >=61%-< 71% | 4 |
| >=71%-< 81% | 3 |
| >=81%-< 91% | 2 |
| >=91% | 1 |
| *Option 2* | |
| >=0% to <=1% | 10 |
| >1% to <=6% | 9 |
| >6% to <=15% | 8 |
| >15% to <=25 | 7 |
| >25% to <=35% | 6 |
| >35% to <=45% | 5 |
| >45% to <=55% | 4 |
| >55% to <=65% | 3 |
| >65% to <=75% | 2 |
| >75% | 1 |

The risk factor may quantitatively assess an entity's financial loss exposure based on data sets comprised of entity cohorts (also referred to as "peer entities") that have experienced similar events to the entity under evaluation. Selection of peer entities for an entity under evaluation may be executed as described below.

To generate the EP curve for an entity and to assess a score for the risk factor, the cyber resilience assessment module 220 may perform peer group analysis to identify peer entities and events for an entity. Peer group analysis may be conducted on entities for the purpose of selecting a sampling of (i) entities that are peers of an entity; and (ii) events experienced by those entities that are suitable for comparison. Peer group analysis for an entity may include multiple phases, including phase one (referred to as "peer entity analysis") and phase two (referred to as "event selection"), where performance of phase one may be a prerequisite to performing phase two. Phase one filtering may not have a minimum number of entities. A sufficient selection of records in phase two may be 10 records. Alternative numbers of records for phase 2 may be used. In phases one and two and for all levels of analysis, a timeline for comparison between entities may be events that have occurred in the past 10 years. In some cases, alternative time periods for event comparison may be used, such as 1, 2, 4, 8, or 16 years. Peer group analysis may group an entity with peer entities based on one or more groupings of analysis as described in Table 14, including global, sector, region, cluster, and cohort groupings. Additional groups may be used as described in Table 14.

TABLE 14

Groupings for Peer Selection Analysis for an Entity

| | Grouping | Industry | Geography | Size |
|---|---|---|---|---|
| 1 | Global | All industry codes | All Geographies | All Sizes |
| 2 | Sector | 2-digit North American Industry Classification System (NAICS) code | All Geographies | All Sizes |
| 3 | Region | 2-digit NAICS code | Same Geographical Region (NA, SA, CALA, EMEA, APAC) | All Sizes |
| 4 | Cluster | 4-digit NAICS code | Same Country | All Sizes |
| 5 | Cohort | 4-digit NAICS code | Same Country | Same Operating Revenue Bin |
| 6 | Reserved for Future Use | 6-digit NAICS code | Same Country | Same Operating Revenue Bin |
| 7 | Reserved for Future Use | 6-digit NAICS code | More granular country region | Same Operating Revenue Bin |

As described in Table 14, an entity may be grouped with peer entities in global, sector, region, cluster, and cohort groupings (e.g., in order of least granular to most granular groupings). To compare the industries, regions, and sizes of entities, the data aggregation module 210 may receive and/or otherwise obtain entity indicator data for each entity evaluated by the cyber resilience assessment tool 200. Entity indicator data may include a number of entity indicators (e.g., such as tuples) that are indicative of characteristics of each entity evaluated by the cyber resilience assessment tool 200. Each indicator may include one or more indicators for each of an entity's industry (e.g., indicated by NAICS codes or any other suitable industry identifier), geographic region (e.g., such as continent, country, state/province, city, and/or any other geographic indicator), and size (e.g., indicated by revenue, number of employees, etc.). Peer entities within each grouping for an entity may have an industry, region, and size (e.g., revenue) as described by Table 14 with respect to the entity. For example, peer entities of the entity in the global grouping may be entities of all industry codes, all geographies and all sizes, while peer entities of the entity in the cohort grouping may be entities having the same 4-digit NAICS code as the entity, located in the same country as the entity, and having the same bin (e.g., categorical assessment) of operating revenue as the entity. While an industry of an entity may be indicated with respect to NAICS codes (e.g., 2, 4, or 6-digit NAICS codes), any suitable identifier for an entity's industry may be used for peer group analysis as described herein.

As a part of phase one of peer group analysis for an entity, the cyber resilience assessment module 220 may perform global peer analysis. For global peer analysis, no filters may be applied the potential peer entities available for comparison, thereby establishing a baseline group of entities (also referred to as a "peer entity group") from which to compare any single entity. All entities may be able to be compared at the global peer analysis level.

Based on performing global peer analysis, the cyber resilience assessment module 220 may perform sector peer analysis, which may filter the group of peer entities determined in the global peer analysis based on the industry corresponding to the entity under evaluation. To filter the group of peer entities, the cyber resilience assessment module 220 may remove entities from the peer entity group that have an industry code (e.g., two-digit NAICS code) different from the respective code of the entity under evaluation, such that the only entities that have the same code as the entity remain in the group of peer entities. Sector peer analysis may select all entities within the same industry as the entity under evaluation for inclusion in the group of peer entities. Examples of industry codes used to perform sector peer analysis are described in Table 15.

TABLE 15

Industry Codes for Sector Peer Analysis

| Code | Industry Title |
|---|---|
| 11 | Agriculture, Forestry, Fishing and Hunting |
| 21 | Mining |
| 22 | Utilities |
| 23 | Construction |
| 31-33 | Manufacturing |
| 42 | Wholesale Trade |
| 44-45 | Retail Trade |
| 48-49 | Transportation and Warehousing |
| 51 | Information |
| 52 | Finance and Insurance |
| 53 | Real Estate Rental and Leasing |
| 54 | Professional, Scientific, and Technical Services |
| 55 | Management of Companies and Enterprises |
| 56 | Administrative and Support and Waste Management and Remediation Services |
| 61 | Educational Services |
| 62 | Health Care and Social Assistance |
| 71 | Arts, Entertainment, and Recreation |
| 72 | Accommodation and Food Services |
| 81 | Other Services (except Public Administration) |
| 92 | Public Administration |

Based on performing sector peer analysis, the cyber resilience assessment module 220 may perform region peer analysis, which may filter the group of peer entities determined in the sector peer analysis based on the geographical region corresponding to the entity under evaluation. To filter the group of peer entities, the cyber resilience assessment module 220 may remove entities from the peer entity group that correspond to a different geographical region from the respective geographical region of the entity under evaluation, such that the only entities that have the same geographical region as the entity remain in the group of peer entities. Region peer analysis may select all entities within the same geographic region as the entity under evaluation for inclusion in the group of peer entities. In some cases, an entity referred to as corresponding to a geographic region may be geographically located in the geographic region or headquartered in the geographic region. Examples of geographic regions used to perform region peer analysis are described in Table 16.

TABLE 16

Regions for Region Peer Analysis

| Code | Region |
| --- | --- |
| NA | North America |
| SA | South America |
| CALA | Central and Latin America |
| EMEA | Europe, Middle East, and Africa |
| APAC | Asia Pacific |

Based on performing region peer analysis, the cyber resilience assessment module 220 may perform cluster peer analysis, which may filter the group of peer entities determined in the region peer analysis based on an industry code (e.g., 4-digit NAICS code) and the country corresponding to the entity under evaluation. To filter the group of peer entities, the cyber resilience assessment module 220 may remove entities from the peer entity group that correspond to a different country from the respective country of the entity under evaluation, such that the only entities that have the same country as the entity remain in the group of peer entities. To filter the group of peer entities, the cyber resilience assessment module 220 may remove entities from the peer entity group that correspond to a different industry from the respective industry of the entity under evaluation, such that the only entities that have the same 4-digit NAICs code as the entity remain in the group of peer entities. Cluster peer analysis may select all entities within the same country and with the same 4-digit NAICS code as the entity under evaluation for inclusion in the group of peer entities. In some cases, an entity referred to as corresponding to a country may be geographically located in the country or headquartered in the country. Examples of industry codes used to perform cluster peer analysis are described in Table 17.

TABLE 17

Industry Codes for Cluster Peer Analysis

| Code | Title |
| --- | --- |
| 5211 | Monetary Authorities-Central Bank |
| 5221 | Depository Credit Intermediation |
| 5222 | Non-depository Credit Intermediation |
| 5223 | Activities Related to Credit Intermediation |
| 5231 | Securities and Commodity Contracts Intermediation and Brokerage |
| 5232 | Securities and Commodity Exchanges |
| 5241 | Insurance Carriers |
| 5251 | Insurance and Employee Benefit Funds |

Based on performing cluster peer analysis, the cyber resilience assessment module 220 may perform cohort peer analysis, which may filter the group of peer entities determined in the cluster peer analysis based on a respective revenue bin corresponding to the revenue (e.g., annual revenue) of the entity under evaluation. Cohort peer analysis may be the most granular of the groupings produced by the peer analysis as described herein. To filter the group of peer entities, the cyber resilience assessment module 220 may obtain a revenue for the entity under evaluation and may determine a revenue bin mapped to the entity's revenue. Based on the mapping, the cyber resilience assessment module 220 remove entities from the peer entity group that correspond to a different revenue bin (e.g., size as described in Table 18) from the respective revenue bin of the entity under evaluation, such that the only entities that have the same revenue bin as the entity remain in the group of peer entities. Cohort peer analysis may select all entities within the same revenue bin as the entity under evaluation for inclusion in the group of peer entities. Examples of revenue bins used to perform cohort peer analysis are described in Table 18. The revenue bins used for cohort peer analysis may deviate from the revenue bins described in Table 18 by using different minimum and/or maximum revenue thresholds for each bins and/or including a different number of bins.

TABLE 18

Revenue Bins for Cohort Peer Analysis

| Size | Min | Max |
| --- | --- | --- |
| Very Large | >$130M USD | n/a |
| Large | >$13M USD | <$130M USD |
| Medium | >$1.3M USD | <$13M USD |
| Small | >$0 USD | <$1.3M USD |

While peer analysis for certain groupings is described herein as being based on other levels of peer analysis, the cyber resilience assessment module 220 may directly perform peer analysis for any of the groupings (e.g., global, sector, region, cluster, and cohort) described herein based on the criteria described in Table 14 without performing peer analysis for any other grouping as a prerequisite. Based on the peer analysis as described herein, peer entity groups may be generated for an entity under evaluation at any and/or all of the global, sector, region, cluster, and cohort groupings.

Based on performing phase one of peer group analysis to determine peer entity group(s) for the entity, as a part of phase two of peer group analysis, the cyber resilience assessment module 220 may perform record selection (e.g., for a minimum selection of 10 records) for one or more loss event types. Examples of loss event types for record selection are described in Table 19. Table 19 further describes an exemplary set of fields that may be used to determine which loss event records correspond to (e.g., are mapped to) a particular loss event type.

TABLE 19

Loss Event Types for Record Selection

| Loss Event Type Classification | Record Categories |
| --- | --- |
| Data disclosure (DD) | Data-Malicious Breach |
| | Data-Physically Lost or Stolen |
| | Data-Unintentional Disclosure |
| Business Interruption (BI) | Cyber Extortion |
| | Network/Website Disruption |
| Fraud (FR) | Identity-Fraudulent Use/Account Access |
| | Phishing, Spoofing, Social Engineering |
| | Skimming, Physical Tampering |
| Privacy (PR) | Privacy-Unauthorized Contact or Disclosure |
| | Privacy-Unauthorized Data Collection |
| Reserved for Future Use | |

The cyber resilience assessment module 220 may select event records for each of the loss event types described in Table 19. The event records may correspond to events experienced by entities in a peer entity group of the entity under evaluation and may be randomly sampled from available event records obtained for the peer entity group. As an example, event records may be derived from and/or included in signals (e.g., signals 112) obtained by the cyber resilience assessment tool 200. Each event record may include an indication of a loss event type and a loss value (e.g., financial and/or economic loss value) experienced by the peer entity to which the event record corresponds. A minimum number (e.g., 10) of event records may be selected for each loss event type. For each loss event type, event records may be initially selected from event records corresponding to peer entities of a peer entity group at a cohort filtering level. If a number of records available for the peer entity group at the cohort filtering level is less than the minimum number (e.g., 10) of selected event records, the peer entity group may change by a single level (e.g., cohort to cluster, cluster to region, region to sector, etc.) of granularity until the minimum number of event records is available for selection for each loss event type. For example, based on determining less than a minimum number of event records are available for the Fraud loss event type for the peer entity group at the cohort filtering level, the cyber resilience assessment module 220 may determine a number of records available for the Fraud loss event type for the peer entity group at the cluster filtering level, which may have more than the minimum number of event records available. Based on the selected loss event records for each loss event type, the cyber resilience assessment module 220 may determine an EP curve for each loss event type as described herein.

In some embodiments, the available loss event records for a peer entity group of an entity under evaluation can be further filtered based on the primary and secondary controls that have contributed to a loss event. Based on such filtering, the loss event records may be more specific and/or otherwise applicable to an evaluated entity's control posture. This filter may use an indication (e.g., list) of control tests being performed against an evaluated entity and an indication (e.g., list) of event records selected using the peer group analysis methodology described herein. Based on such filtering, the event records selected for peer comparison may reflect the corresponding failed, missing, and/or compromised controls as the controls corresponding to the entity.

In some embodiments, to determine a score for the risk factor as described herein, the cyber resilience assessment module 220 may generate cyber loss simulation data and one or more related EP curves. Cyber loss simulation data and each EP curve may be generated based on the selection of loss event records and included loss values obtained from peer entity group(s). The EP curve may represent the potential loss values for the entity and corresponding probabilities segmented into three high-level scenarios that each correspond to one of the loss event types described herein, including DD, BI, and FR loss event types. The EP curve may provide a probabilistic view of the loss potentials of the entity under evaluation, such that the EP curve provides a graphical representation of the probability that a certain level of loss will be exceeded. This EP curve can be generated (e.g., computed) using one or more (e.g., four) methods based on an availability of data as indicated below, where each method may generate an EP curve indicating a unique views of an entity's loss potential. In some cases, three EP curves may be generated for an evaluated entity to represent the possible loss values and corresponding probabilities for each of loss event types described herein (e.g., DD, BI, and FR loss event types). Based on data availability (e.g., availability of event records for each loss event type), three EP curves may be generated for each entity to illustrate the confidence level of cyber loss exposure for which an entity is susceptible.

In some embodiments, the cyber resilience assessment module 220 may generate an uncalibrated EP curve (also referred to as a "level one EP curve" or "L1 EP curve"). The uncalibrated EP curve may be a default curve generated by the cyber resilience assessment module 220 for evaluation of an entity. The uncalibrated EP curve may be generated based only on a loss potential of the peer entity group of an entity. For generation of an uncalibrated EP curve, the minimum, maximum, mode, and/or lambda values for the range of loss values from the selected loss event records may be computed and provided as an input for a number of Monte Carlo simulations. The minimum, maximum, and mode values for the range of loss values from the selected loss event records may be used to generate a beta PERT distribution, where the generated beta PERT distribution may be used as an input distribution from which to execute a number of Monte Carlo simulations (also referred to as "iterations"). The lambda value for the range of loss values from the selected loss event records may be a kurtosis value computed from the generated beta PERT distribution. Output cyber loss simulation data of the number of executed Monte Carlo simulations may be used to generate the uncalibrated EP curve.

In some embodiments, the cyber resilience assessment module 220 may generate an outside-in calibrated EP curve (also referred to as a "level two EP curve" or "L2 EP curve"). The outside-in calibrated EP curve may be generated when outside-in assessment results are available and/or otherwise included in the signals 112. For generation of the outside-in calibrated EP curve, a 1 to 100 outside-in score may be used to select a loss value from the $25^{th}$ to the $75^{th}$ percentile of the range of loss values from the selected loss event records. The minimum and maximum values for the range of loss values from the selected loss event records and the loss value at the loss percentile that corresponds to the outside-in score may be computed and provided as an input for a number of Monte Carlo simulations. The minimum and maximum values for the range of loss values from the selected loss event records and the selected loss value (e.g., functioning as the mode value of the loss values) may be used to generate a beta PERT distribution, where the generated beta PERT distribution may be used as an input distribution from which to execute a number of Monte Carlo simulations. Output cyber loss simulation data of the number of executed Monte Carlo simulations may be used to generate the outside-in calibrated EP curve.

In some embodiments, the cyber resilience assessment module 220 may generate an survey-input/self-attestation calibrated EP curve (also referred to as a "level three EP curve" or "L3 EP curve"). The survey-input/self-attestation calibrated EP curve may be generated when a customer has provided answers to survey questions (e.g., obtained by the data aggregation module 210). The survey-input/self-attestation calibrated EP curve may an internal representative view of an entity's control posture.

In some embodiments, the cyber resilience assessment module 220 may generate an inside-out calibrated EP curve (also referred to as a "level four EP curve" or "L4 EP curve"). The inside-out calibrated EP curve may be generated when there are inside-out assessment results available. For generation of the inside-out calibrated EP curve, a 1 to 100 inside-out score may be used to select a loss value from the $25^{th}$ to the $75^{th}$ percentile of the range of loss values from the selected loss event records. The minimum and maximum values for the range of loss values from the selected loss event records and the loss value at the loss percentile that corresponds to the inside-out score may be computed and provided as an input for a number of Monte Carlo simulations. The minimum and maximum values for the range of loss values from the selected loss event records and the selected loss value (e.g., functioning as the mode value of the loss values) may be used to generate a beta PERT distribution, where the generated beta PERT distribution may be used as an input distribution from which to execute a number of Monte Carlo simulations. Output expected loss results of the number of Monte Carlo simulations are used to generate the inside-out calibrated EP curve.

In some embodiments, one or more of the EP curves described herein may be combined to generate a combination EP curve derived from number of validated sources. For example, an entity's outside-in calibrated EP curve results can be combined with a survey-input/self-attestation calibrated EP curve to produce a combination EP curve. In some cases, an entity (via the cyber resilience assessment tool 200) can entirely skip the assessments for generating a survey-input/self-attestation calibrated EP curve and may directly cause generation of an inside-out calibrated EP curve. The cyber resilience assessment tool 200 may generate an inside-out calibrated EP curve by mapping the indicators of each assessment to each other and choosing the values with the most validity to produce an aggregate curve. The validity of each of the EP curves may increase as the level of each EP curve increases from level one to level four. In some cases, the L2 and L3 EP curves may have similar levels of validity.

In some embodiments, an intersection of a materiality threshold relative to a probability of an EP curve may be selected for scoring of the risk factor. The methods and procedures for determining an entity's materiality threshold are described below.

To enhance assessment and scoring of the risk factor, the cyber resilience assessment module 220 may determine a financial materiality threshold for an entity under evaluation. In one example, a financial materiality can be assessed based on 2%-10% of an entity's gross revenue (e.g., as reported by the Bureau van Dijk Orbis firmographic database). Table 20 describes an exemplary set of materiality thresholds (MTs) that may be used to determine the probability for scoring the risk factor when plotted on an EP curve.

TABLE 20

Materiality Threshold and Criteria

| Industry | NAICS Codes | Materiality Threshold |
|---|---|---|
| Utilities, Information, Finance and Insurance, Health Care and Social Assistance | 22, 51, 52, 62 | 2% |
| Manufacturing; Wholesale Trade; Retail Trade; Professional, Scientific, and Technical Service; Management of Companies and Enterprises; Administrative and Support and Waste Management and Remediation Services; Educational Services; Health Care and Social Assistance; Public Administration | 31-33, 42, 44-45, 54, 55, 56, 61, 92 | 5% |
| Agriculture, Forestry, Fishing, and Hunting; Mining; Construction; Transportation and Warehousing; Real Estate Rental and Leasing; Arts, Entertainment, and Recreation; Accommodation and Food Services; Other Services (except Public Administration) | 11, 21, 23, 48-49, 53, 71, 72, 81 | 10% |

As described by Table 20, a materiality threshold may be selected for an entity based on the entity's industry (e.g., as described by the entity's respective 2-digit NAICS code). For example, an entity having an NAICS code of 51 may have a selected materiality threshold of 2%. The materiality threshold and corresponding revenue value (e.g., based on the entity' annual gross revenue) for an entity may be used to determine an EP value from one or more of the generated EP curves for the entity. For example, for an entity with an NICS code of 31 and a gross annual revenue of 5,000,000 USD, a materiality threshold of 5% may produce a revenue value of 250,000 USD. Generated EP curves for the entity may be used to determine a probability (e.g., EP value) with which the entity's losses due to loss events may exceed the 250,000 USD threshold. Based on determining the probability, the probability may be mapped to the EP value thresholds described for either Option 1 or Option 2 in Table 13 to determine a risk factor score for the entity. Based on the selected materiality threshold, generated EP curves, and an entity's revenue value, a risk factor may be scored as described below.

In some embodiments, as described herein, one or more EP curves may be generated for an entity based on loss event types for selected event records used to generate the EP curves. An EP curve may be an uncalibrated EP curve that is based solely on the loss potential of the peer entity group for an entity under evaluation. An EP curve may be an outside-in calibrated EP curve that is based on scaling an uncalibrated EP curve by factoring in the entity's cyber security score using a completed outside-in assessment (e.g., where the assessment collects signals indicative of an entity's governance, fortitude, and threat factors externally to the entity's computing assets and networks). An EP curve may be an survey-input/self-attestation calibrated EP curve that is based on scaling the uncalibrated EP curve by the entity's self-attestation of their control posture using a completed survey-based assessment. The survey-input/self-attestation calibrated EP curve may be used when an entity has provided answers to survey questions and has not provided a full set of technical data from inside the entity. An EP curve may be an inside-out calibrated EP curve that is based on scaling an uncalibrated EP curve by factoring in the entity's cyber security score using a completed inside-out assessment (e.g., where the assessment only collects data for an entity's governance, fortitude, and threat factors internal and external to the entity's computing assets and networks). In order from least confidence to most confidence in expected losses, the EP curves may be ordered uncalibrated, outside-in calibrated, survey-input/self-attestation calibrated, and inside-out calibrated. The calibrated EP curves may illustrate the change in the probability that a certain level of loss will be exceeded given the entity's control state. This may increase or decrease the likelihood of exceeding losses at the materiality value relative to their peers.

In some embodiments, to generate EP curves as described herein, the cyber resilience assessment module 220 may generate datasets including event records for peer entity groups of an entity. The cyber resilience assessment module 220 may receive event records obtained by the data aggregation module 210 and may generate the datasets for each of the global, sector, region, cluster, and cohort peer entity groupings for an entity under evaluation. For each of the peer entity groups, the cyber resilience assessment module 220 may determine a number of available event records for each loss event type (e.g., loss event types including DD, BI, and FR loss event types). For each loss event type, the cyber resilience assessment module 220 may select a dataset of event records for a most granular of the peer entity groups that includes at least a minimum number (e.g., 10) of event records. As an example, the cyber resilience assessment module 220 may select datasets for the data disclosure and business interruption loss event types for the peer entity group at the cohort filtering level and may select a dataset for the fraud loss event type for the peer entity group at the cluster filtering level.

In some embodiments, based on selecting the dataset of event records for the most granular of the peer entity groups that includes at least a minimum number of event records for each loss event type, the cyber resilience assessment module 220 may generate an uncalibrated EP curve for each loss event type. To generate the uncalibrated EP curve, the cyber resilience assessment module may obtain and determine peer-group minimum, mode, maximum, and lambda values that summarize the loss values of the dataset of event records for each loss event type (e.g., loss event types including DD, BI, and FR loss event types). The minimum, maximum, and mode values for the range of loss values from the selected loss event records may be used to generate a beta PERT distribution, where the generated beta PERT distribution may be used as an input distribution from which to execute a number of Monte Carlo simulations (also referred to as "iterations"). The lambda value for the range of loss values from the selected loss event records may be a kurtosis value computed from the generated beta PERT distribution. Based on determining the minimum, mode, maximum, and lambda values for the loss values for each dataset, the cyber resilience assessment module 220 may execute a number of simulations (e.g., 50,000-500,000 simulations) of cyber events based on the input beta PERT distribution to determine expected loss values for each loss event type using Monte Carlo analysis (or another suitable simulation technique). For example, the cyber resilience assessment module 220 may execute 100,000 Monte Carlo simulations of cyber events to determine expected losses by the entity over an annual period. Monte Carlo analysis may be performed based on the minimum, mode, maximum, and/or lambda values determined from the loss values of the dataset of event records for each loss event type as described herein. Based on the Monte Carlo analysis and executed simulations of expected loss values for each loss event type, the cyber resilience assessment module 220 may obtain cyber loss simulation data that can be used to generate an uncalibrated EP curve for each loss event type indicative of the entity's loss potential and related probability of such loss potential. The cyber resilience assessment module 220 may generate an uncalibrated EP curve for each loss event type based on the cyber loss simulation data.

In some embodiments, the cyber resilience assessment module 220 may generate an outside-in calibrated EP curve for each loss event type. Generating the outside-in calibrated EP curve may be based on scaling the generated uncalibrated loss curve by factoring in the entity's cyber security score that can be based on assessment results for a completed outside-in cyber security assessment. The assessment results for the outside-in cyber security assessment may be included in the signals 112. The method described below for generating the outside-in calibrated EP curve for each loss event type may be a formula for producing a single loss event (SLE) curve. To generate the outside-in calibrated EP curve, the cyber resilience assessment module 220 may derive a scaling value (e.g., a new mode value for generating a beta PERT distribution). To derive the scaling value, the cyber resilience assessment module 220 may obtain each of:
  i. the entity's score for the detection and response subfactor referred to as "$z_1$" as determined based on an outside-in assessment
  ii. the minimum possible score for the detection and response subfactor referred to as "$p_1$"
  iii. the maximum possible score for the detection and response subfactor referred to as "$p_2$"
  iv. the minimum loss value of the uncalibrated EP curve referred to as "$q_{1i}$", where "i" refers to each loss event type (e.g., i={DD, BI, FR})
  v. the 75$^{th}$ quantile loss value of the uncalibrated EP curve referred to as "$q_{2i}$", where "i" refers to each loss event type (e.g., i={DD, BI, FR})

Based obtaining each of the above recited scores and values, the cyber resilience assessment module 220 may obtain an estimated mode value for each loss event type that is representative of the detection and response control strength of the respective uncalibrated EP curve for the loss event type. The estimated mode value for each loss event type (referred to as "i", where i={DD, BI, FR}) may be described by Equations 11a and 11b.

$$k_i = (q_{2i} - q_{1i})/(p_1 - p_2) \tag{11a}$$

$$\text{New Mode Value}_i = (k_i \times z_1) + q_{2i} \tag{11b}$$

The minimum, maximum, and estimated new mode values for the range of loss values from the selected loss event records may be used to generate a beta PERT distribution, where the generated beta PERT distribution may be used as an input distribution from which to execute a number of Monte Carlo simulations. The lambda value for the range of loss values from the selected loss event records may be a kurtosis value computed from the generated beta PERT distribution.

Based on determining the estimated new mode value for each loss event type, the cyber resilience assessment module 220 may execute a number of simulations (e.g., 50,000-500,000 simulations) of cyber events based on the input beta PERT distribution (e.g., generated based on the estimated new mode value) to determine expected cyber losses for each loss event type using Monte Carlo analysis (or another suitable simulation technique). For example, the cyber resilience assessment module 220 may execute 100,000 Monte Carlo simulations of cyber events to determine expected losses by the entity over an annual period. Monte Carlo analysis may be performed based on the minimum, estimated new mode (e.g., as defined by Equation 11b), maximum, and/or lambda values determined from the loss values of the dataset of event records for each loss event type as described herein. Based on the Monte Carlo analysis and executed simulations of expected loss values for each loss event type, the cyber resilience assessment module 220 may obtain cyber loss simulation data that can be used to generate an outside-in calibrated EP curve for each loss event type indicative of the entity's loss potential and related probability of such loss potential. The cyber resilience assessment module 220 may generate an outside-in calibrated EP curve for each loss event type based on the cyber loss simulation data.

In some embodiments, the cyber resilience assessment module 220 may generate an inside-out calibrated EP curve for each loss event type. Generating the inside-out calibrated EP curve may be based on scaling the generated uncalibrated loss curve by factoring in the entity's cyber security score that can be based on assessment results for a completed inside-out cyber security assessment. The assessment results for the inside-out cyber security assessment may be included in the signals 112. The method described below for generating the inside-out calibrated EP curve for each loss event type may be a formula for producing a single loss event (SLE) curve. To generate the inside-out calibrated EP curve, the cyber resilience assessment module 220 may derive a scaling value (e.g., a new mode value for generating a beta PERT distribution). To derive the scaling value, the cyber resilience assessment module 220 may obtain each of:
  i. the entity's score for the detection and response subfactor referred to as "$z_2$" as determined based on an inside-out assessment
  ii. the minimum possible score for the detection and response subfactor referred to as "$p_1$"
  iii. the maximum possible score for the detection and response subfactor referred to as "$p_2$"
  iv. the minimum loss value of the uncalibrated EP curve referred to as "$q_{1i}$", where "i" refers to each loss event type (e.g., i={DD, BI, FR})
  v. the $75^{th}$ quantile loss value of the uncalibrated EP curve referred to as "$q_{2i}$", where "i" refers to each loss event type (e.g., i={DD, BI, FR})

Based obtaining each of the above recited scores and values, the cyber resilience assessment module 220 may obtain an estimated mode value for each loss event type that is representative of the detection and response control strength of the respective uncalibrated EP curve for the loss event type The estimated mode value for each loss event type (referred to as "i", where i={DD, BI, FR}) may be described by Equations 12a and 12b.

$$k_i = (q_{2i} - q_{1i})/(p_1 - p_2) \tag{12a}$$

$$\text{New Mode Value}_i = (k_i \times z_2) + q_{2i} \tag{12b}$$

The minimum, maximum, and estimated new mode values for the range of loss values from the selected loss event records may be used to generate a beta PERT distribution, where the generated beta PERT distribution may be used as an input distribution from which to execute a number of Monte Carlo simulations. The lambda value for the range of loss values from the selected loss event records may be a kurtosis value computed from the generated beta PERT distribution.

Based on determining the estimated new mode value for each loss event type, the cyber resilience assessment module 220 may execute a number of simulations (e.g., 50,000-500,000 simulations) of cyber events based on the input beta PERT distribution to determine expected loss values for each loss event type using Monte Carlo analysis (or another suitable simulation technique). For example, the cyber resilience assessment module 220 may execute 100,000 Monte Carlo simulations of cyber events to determine expected losses by the entity over an annual period. Monte Carlo analysis may be performed based on the minimum, estimated new mode (e.g., as defined by Equation 12b), maximum, and/or lambda values determined from the loss values of the dataset of event records for each loss event type as described herein. Based on the Monte Carlo analysis and executed simulations of expected loss values for each loss event type, the cyber resilience assessment module 220 may obtain cyber loss simulation data that can be used to generate an inside-out calibrated EP curve for each loss event type indicative of the entity's loss potential and related probability for the entity's loss potential. The cyber resilience assessment module 220 may generate an inside-out calibrated EP curve for each loss event type based on the cyber loss simulation data.

In some embodiments, based on determining cyber loss simulation data for each of the uncalibrated, outside-in calibrated, and inside-out calibrated EP curves, the cyber resilience assessment module 220 may obtain the cyber loss simulation data for the highest confidence type of EP curve. In order of lowest to highest confidence, the EP curves may be ordered as: uncalibrated EP curve, outside-in calibrated EP curve, and inside-out calibrated EP curve. Availability of outside-in and inside-out calibrated EP curves may be based on whether respective outside-in and inside-out assessment data is available to generate scores for a detection and response subfactor. Based on obtaining the cyber loss simulation data for the highest confidence type of EP curve, the cyber resilience assessment module 220 may determine an extreme value for the cyber loss simulation data for each loss event type, where the extreme value is an expected loss value that is one standard deviation away from a median expected loss value determined from the cyber loss simulation data. For example, the extreme value may be an expected loss value that is one standard deviation greater than a median expected loss value determined from the cyber loss simulation data. Based on determining the extreme value for each loss type, the cyber resilience assessment module 220 may determine a materiality value for the entity under evaluation, where the materiality value is equivalent to an entity's materiality threshold (e.g., as described with respect to the entity's industry in Table 20) multiplied by the entity's gross revenue (e.g., annual gross revenue). Based on determining the materiality value for the entity, the cyber resilience assessment module 220 may determine a materiality ratio for each loss type as described by Equations 13a, 13b, and 13c.

$$\text{Materiality ratio}_{BI} = \frac{Extreme_{BI}}{(\text{Materiality Value})} \tag{13a}$$

$$\text{Materiality ratio}_{DD} = \frac{Extreme_{DD}}{(\text{Materiality Value})} \tag{13b}$$

$$\text{Materiality ratio}_{FR} = \frac{Extreme_{FR}}{(\text{Materiality Value})} \tag{13c}$$

As shown by Equations 13a, 13b, and 13c, a materiality ratio may be determined for each of the BI, DD, and FR loss event types using the extreme value for each loss event type and the material value as described herein. From the determined materiality ratios for each loss event type, the cyber resilience assessment module 220 may identify and select the loss event type corresponding to a highest of the determined materiality ratios. For example, based on determining the fraud loss event type to have the highest of the materiality ratios, the cyber resilience assessment module may select the fraud loss event type.

In some embodiments, based on determining the loss event type corresponding to the highest of the determined materiality ratios, the cyber resilience assessment module 220 may generate an EP curve for the cyber loss simulation data corresponding to the highest confidence type of EP curve. To generate the EP curve, the cyber resilience assessment module 220 may obtain the cyber loss simulation data corresponding to the highest confidence type of EP curve. From the obtained cyber loss simulation data, the cyber resilience assessment module 220 may determine loss probabilities for a number of loss values. The cyber resilience assessment module 220 may generate the EP curve by plotting the determined loss probabilities on a y axis and the respective loss values on an x axis of a chart. The cyber resilience assessment module may plot a vertical line on the generated chart including the EP curve at value on the x axis corresponding to the determined materiality value for the entity. In some cases, the cyber resilience assessment module 220 may repeat each of the above-described steps for the remaining materiality ratios determined for the other respective loss event types to generate a respective EP curve for each of the loss event types.

In some embodiments, based on plotting a vertical line on the generated chart including the EP curve at value on the x axis corresponding to the determined materiality value for the entity, the cyber resilience assessment module 220 may determine the EP value at the y-axis intersect corresponding to the plotted materiality value, where the EP value corresponds to a probability that a loss value for the entity will exceed a value equivalent to the materiality value. In some cases, the cyber resilience assessment module 220 may determine an EP value for only the highest materiality ratio and respective selected loss event type. Based on determining the EP value for the entity, the cyber resilience assessment module 220 may determine a score for the risk factor based on the EP value thresholds and respective risk factor score corresponding to the determined EP value as defined by one of the rubrics (Option 1 or Option 2) in Table 13. As an example, for an EP value of 25%, for Option 1 as described in Table 13, the risk factor score for the entity may be 8. As another example, for an EP value of 48%, for Option 2 as described in Table 13, the risk factor score for the entity may be 4. The determined risk factor score may be used to determine a cyber resilience rating as described herein.

Exemplary Testing for Insurance and Capital Reserves

In some cases, the cyber risk assessment module 220 may perform exemplary testing for an entity's ability to withstand near worst case events. For an entity that has transferred risk to an insurer, the testing can include an analysis of the entity's relevant insurance policies. For an entity that is "self-insured" with capital reserves, the testing can include an analysis of the entity's capital reserve allocation inputs. In some cases, for entity with both insurance and "self-insurance", the testing can include analysis of both insurance and capital reserve allocation inputs.

To perform analysis and testing of the entity's ability to withstand near worst case events, the cyber resilience assessment module 220 may obtain the cyber loss simulation data corresponding to the highest confidence type of EP curve and respective generated EP curve for each loss event type. Based on the obtained data and EP curves, for each loss event type, the cyber resilience assessment module 220 may determine and select a loss value from the $95^{th}$ percentile of the respective EP curve. For each selected loss value, the cyber resilience assessment module 220 may deduct one or more of (i) the entity's applicable insurance coverages for the respective loss event type (e.g., after accounting for deductible/retention values); and (ii) any of the entity's capital reserves specifically earmarked for cyber losses. The entity's capital reserves may correspond to an amount of capital that was input into an allocation exercise and may not correspond to the computed output of capital allocation. The ratio of the loss value minus deductions relative to the materiality value previously determined for scoring of the risk factor subfactor may be used to determine a stress ratio for that loss event type. Equations 14a, 14b, and 14c describe stress ratio determination for each loss event type.

$$Stress_{DD} = \frac{DD_{95th} - \text{Insurance} - \text{Capital Reserves}}{(MT * \text{Gross Revenue})} \quad (14a)$$

$$Stress_{BI} = \frac{BI_{95th} - \text{Insurance} - \text{Capital Reserves}}{(MT * \text{Gross Revenue})} \quad (14b)$$

$$Stress_{FR} = \frac{FR_{95th} - \text{Insurance} - \text{Capital Reserves}}{(MT * \text{Gross Revenue})} \quad (14c)$$

Based on the determined stress ratios as determined by Equations 14a, 14b, and 14c, the cyber resilience assessment module 220 may determine and select a highest of the determined stress ratios. Using the highest stress ratio, a stress test subfactor may be scored as described by Table 21.

TABLE 21

Stress Test Subfactor Scoring Methodology

| Stress Test Evaluation | Stress Test Subfactor Score | | | |
|---|---|---|---|---|
| | With Insurance and Reserves | With Insurance Only | With Reserves Only | With Neither |
| High x > 200% | 2 | 1 | 1 | 0 |
| Medium x > 100% | 3 | 2 | 2 | 1 |
| Low x < 100% | 4 | 3 | 3 | 2 |

As shown in Table 21, the stress test subfactor may be score on a 0-4 scale, with 0 being the lowest (worst) possible score and 4 being the highest (best) possible score to evaluate an entity's ability to withstand near worst case events. The scoring may be based on whether the stress ratios determined for an entity included insurance coverages, capital reserves, or neither insurance coverages nor capital reserves. For example, an entity with a highest stress ratio of 105% that has only capital reserves and not insurance coverage may be assigned a stress test subfactor score of 2.

Exemplary Scoring for a Threat Factor

In some cases, the cyber risk assessment module 220 may generate a score for a threat factor. The threat factor may provide an indication of a relative amount of threat activity facing the entity compared to the entity's peers. An entity's threat activity and assessed score for a threat factor may be based on subfactors including a potential attack vector (e.g., measures of methods attackers can access an entity's computing systems and/or assets), malicious activity (e.g., measures of actual attacks on an entity's computing systems and/or assets), precursor attack data (e.g., threat activity against the entity's computing systems and/or assets, supply chain, and/or utilized services), and adversarial threats (e.g., which threat actors are targeting which industries) subfactor. Such subfactors as described herein can be encapsulated in a generated threat score. In some embodiments, the threat factor may be scored on a 0-100 scale and is evaluated according to a rubric for the subfactors (e.g., subfactors 106) of the threat factor and respective capabilities (e.g., capabilities 108) as shown in Table 22. Each of the subfactors may assess how prolific a conversation in the threat actor space is about an entity as compared to the entity's peers. The subfactors may assess an amount of precursor events to a specific cyber event (e.g., attach or incident) and subsequent incidents. In some cases, the threat factor may be measured and weighted using various gradients and scales different from those described in Table 22.

TABLE 22

Threat Factor Scoring Methodology

| Subfactor | Capabilities | Total Points | Weight |
|---|---|---|---|
| Attack Vectors | Phishing Campaigns<br>Extortion<br>Attacker Requests for Help | 0-100 | 25% |
| Malicious Activity | Compromised assets<br>Suspicious traffic and anonymous activity<br>Brand abuse<br>Insider Threat | 0-100 | 25% |
| Precursor Attack Data | Credentials<br>Intellectual Property<br>Customer Data<br>Employees' Data<br>Technical Information | 0-100 | 25% |
| Adversarial Threats | Sophistication Level<br>Attack Methods | 0-100 | 25% |

As shown in Table 22, in this particular embodiment, each of the subfactors (e.g., subfactors 106) may be scored on a scale of 0-100, multiplied by a respective weight, and summed to produce a score for the governance factor as described by Equation 15.

$$\text{Threat Factor Score} = \sum_{x=1}^{4} Subfactor_x * Weight_x \quad (15)$$

In this particular embodiment, each subfactor may be weighted evenly. In other embodiments, the weights may be altered to address entity-specific and/or industry-specific needs. Each individual subfactor may be scored independently as described below. A score for each subfactor may represents a degree of the subfactor relative to the entity's peers or other industries.

In some embodiments, a threat factor may include an entity's potential attack vectors (referred to herein as "potential attack vectors") as a subfactor. An entity's potential attack vectors subfactor may measure an attacker's interest level, which can affect the likelihood of the potential attack vector being leveraged. The potential attack vectors subfactor may be representative of one or more the following areas of information in underground and dark web forums targeting the entity: (i) phishing campaigns, (ii) extortion campaigns, (iii) attacker requests for help, and (iv) recruitment attempts of insiders. The more potential attack vectors there are, the more the entity is at risk of a cyber incident. Accordingly, potential attack vectors subfactor may indicate both the interest level of threat-actors in targeting the entity the threat-actors' propensity for attack. A score for an entity's potential attack vectors subfactor may be based on one or more capabilities (e.g., capabilities 108) and corresponding criteria. Examples of capabilities indicative of the potential attack vectors subfactor are described in Table 23.

TABLE 23

Potential Attack Vectors Subfactor Scoring Methodology

| Potential Attack Vectors Capability | Criteria | Total Points | Weight |
|---|---|---|---|
| Phishing Campaigns | Measures activity indicating a possible phishing attack against the entity, based on underground web sources and network traffic analysis | 0-100 | 25% |
| Extortion Campaigns | Measures activity indicating a possible extortion campaign against the entity, based on underground web sources | 0-100 | 25% |
| Attacker requests for help | Measures of the amount of underground chatter of threat-actors' requesting help or information in the context of breaching/abusing the evaluated entity's assets | 0-100 | 25% |
| Presence in Underground Sources | Measures the presence of the assessed entity in cyber related underground forums which are known as malicious and directly indicates threat-actors' malicious interests in the entity | 0-100 | 25% |

The potential attack vectors subfactor may be assessed by a number of indicators (e.g., indicators 110) that quantify each of the capabilities described in Table 23. Indicators may be derived from signals (e.g., signals 112) as described herein for the cyber resilience assessment tool 200. In this particular embodiment, each of the capabilities may be scored on a scale of 0 to 100, multiplied by a respective weight, and then summed to produce a score for the potential attack vectors subfactor as described by Equation 16.

$$\text{Potential Attack Vectors Subfactor Score} = \sum_{x=1}^{4} Capability_x * Weight_x \quad (16)$$

In this particular embodiment, each capability may be weighted evenly. In other embodiments, the weights may be altered to address entity-specific and/or industry-specific needs. For example, weighting may be skewed toward one or more of the capabilities described in Table 23 based on the one or more capabilities being capabilities of interest.

In some embodiments, a threat factor may include malicious activity directed to an entity (referred to herein as "malicious activity") as a subfactor. An entity's malicious activity subfactor may measure actual events that are targeting an entity. The potential attack vectors subfactor may be representative of activity detected on the dark web, underground forums or other platforms covering one or more of: (i) compromised assets, (ii) suspicious traffic and anonymous activity, and (iii) brand abuse. The more potential attack vectors there are, the more the entity is at risk of a cyber incident. A score for an entity's malicious activity subfactor may be based on one or more capabilities (e.g., capabilities 108) and corresponding criteria. Examples of capabilities indicative of the malicious activity subfactor are described in Table 24.

TABLE 24

Malicious Activity Subfactor Scoring Methodology

| Malicious Activity Capability | Criteria | Total Points | Weight |
|---|---|---|---|
| Compromised Assets | Measures the amount of compromised assets in different time frames, analyzing the trend of it and comparing it to its cohort group. | 0-100 | 25% |

TABLE 24-continued

Malicious Activity Subfactor Scoring Methodology

| Malicious Activity Capability | Criteria | Total Points | Weight |
|---|---|---|---|
| Malicious Network Traffic | Measures the amount/frequency of events that indicate that a malicious actor is abusing or comprising the assessed entity's assets, based on network traffic analysis. | 0-100 | 25% |
| Brand Abuse | Measures the amount of brand abuse events that the entity suffered in a certain time frame, compared to the entity's cohort peer group. | 0-100 | 25% |
| Insider Threat | Measures of the actual evidence of insider threats, based on dark web and underground sources. | 0-100 | 25% |

The malicious activity subfactor may be assessed by a number of indicators (e.g., indicators 110) that quantify each of the capabilities described in Table 24. Indicators may be derived from signals (e.g., signals 112) as described herein for the cyber resilience assessment tool 200. Measurements of the compromised assets capability may be based on measurements from dark web and underground forums and blocklists. The malicious network traffic capability may measure protective Domain Name System (DNS) datasets and detects anomalies and suspicious communications between the assessed entity's assets and other external assets. Such analysis includes detecting communication between the assessed entity's assets and known command and control (C&C) servers, malware servers, spam services, bot services, and block-listed assets. The malicious network traffic capability may measure the assessed entity's response time to such events as compared to the entity's cohort peer group. The brand abuse capability may measure brand abuse events such as impersonation, defacements, and abused assets of the entity. Brand abuse events can harm the reputation of the entity and can potentially be a part of an attack-chain directed to the entity.

In this particular embodiment, each of the capabilities described in Table 24 may be scored on a scale of 0 to 100, multiplied by a respective weight, and then summed to produce a score for the malicious activity subfactor as described by Equation 17.

$$\text{Malicious Activity Subfactor Score} = \sum_{x=1}^{4} Capability_x * Weight_x \quad (17)$$

In this particular embodiment, each capability may be weighted evenly. In other embodiments, the weights may be altered to address entity-specific and/or industry-specific needs. For example, weighting may be skewed toward one or more of the capabilities described in Table 24 based on the one or more capabilities being capabilities of interest.

In some embodiments, a threat factor may include precursor attack data directed to an entity (referred to herein as "precursor attack data") as a subfactor. An entity's precursor attack data subfactor may measure an amount of exposed precursor attack data corresponding to the evaluated entity in a certain time frame as compared to the entity's cohort peer group. The precursor attack data subfactor may measure actual evidence of leaked information corresponding to the entity that is available on the dark web and in underground forums, such as leaked credentials, intellectual property, customer data, and technical specifications. Such leaked information may be a result of an attack on the evaluated entity and/or on affiliate(s) of the entity. Data leaks are often the result of past breaches of the entity's computing systems and/or assets, the entity's supply chain, and/or affiliates of the entity that have access to the entity's data. The greater the amount of an entity's data that is available on the Dark Web, the greater the entity's risk for a cyber incident. Malicious threat actors can leverage the entity's publicly exposed data to cause additional far-reaching effects, such as additional data breaches, system compromises, loss of brand reputation, and financial losses.

A score for an entity's precursor attack data subfactor may be based on one or more capabilities (e.g., capabilities 108) and corresponding criteria. Examples of capabilities indicative of the precursor attack data subfactor are described in Table 25.

TABLE 25

Precursor Attack Data Subfactor Scoring Methodology

| Precursor Attack Data Capability | Criteria | Total Points | Weight |
|---|---|---|---|
| Leaked Credentials | Availability of entity's credentials (purported or real) | 0-100 | 20% |
| Leaked Intellectual Property | Availability of intellectual property from the entity | 0-100 | 20% |
| Leaked Customer Data | Customer data purported to be exfiltrated from the entity | 0-100 | 20% |
| Leaked Technical Specifications | Information about an entity's technological infrastructure | 0-100 | 20% |
| Leaked Employees' Data | Employees' personal data which can be used by threat-actors for further malicious activities | 0-100 | 20% |

The precursor attack data subfactor may be assessed by a number of indicators (e.g., indicators 110) that quantify each of the capabilities described in Table 25. Indicators may be derived from signals (e.g., signals 112) as described herein for the cyber resilience assessment tool 200. In this particular embodiment, each of the capabilities described in Table 25 may be scored on a scale of 0 to 100, multiplied by a respective weight, and then summed to produce a score for the precursor attack data subfactor as described by Equation 18.

$$\text{Precursor Attack Data Subfactor Score} = \sum_{x=1}^{5} Capability_x * Weight_x \quad (18)$$

In this particular embodiment, each capability may be weighted evenly. In other embodiments, the weights may be altered to address entity-specific and/or industry-specific needs. For example, weighting may be skewed toward one or more of the capabilities described in Table 25 based on the one or more capabilities being capabilities of interest.

In some embodiments, a threat factor may include adversarial threats directed to an entity (referred to herein as "adversarial threats") as a subfactor. An entity's adversarial threats subfactor may measure the adversarial threats that are most threatening to the evaluated entity's industry. The measurement may be derived from segmentation of threat actors' capability level of the threat groups. As an example, for a threat group corresponding to nation state attackers, the threat group may have a threat capability of between 95% and 99%.

A score for an entity's adversarial threats subfactor may be based on one or more capabilities (e.g., capabilities 108) and corresponding criteria. An example capability indicative of the adversarial threats subfactor is described in Table 26.

TABLE 26

Adversarial Threats Subfactor Scoring Methodology

| Adversarial Threats Capability | Criteria | Total Points | Weight |
|---|---|---|---|
| Sophistication Level | The sophisticated level of the attacker is determined by the tactics, techniques, and procedures (TTPs) they use as well as their national origin and affiliation (cybercrime, state-sponsored, nation-state). The sophistication level assessed by three levels: High, Medium, and Low. | 0-100 | 20% |

The adversarial threats subfactor may be assessed by a number of indicators (e.g., indicators 110) that quantify the capability described in Table 26. Indicators may be derived from signals (e.g., signals 112) as described herein for the cyber resilience assessment tool 200. In this particular embodiment, the capability described in Table 26 may be scored on a scale of 0 to 100 to produce a score for the adversarial threats subfactor.

Exemplary Scoring for a Cyber Resilience Rating

In some embodiments, the cyber resilience assessment module 220 of the cyber resilience assessment tool may determine a cyber resilience rating based on the governance, fortitude, and risk factors corresponding to respective governance, fortitude, and risk postures of an entity. The cyber resilience rating ranking scale as described in Table 27 may be representative of how often a rated entity is expected to experience material cyber events as compared to other entities.

TABLE 27

Cyber Resilience Rating Rankings

| Position | Rating |
|---|---|
| Leaders | CR1 |
|  | CR2 |
| Average | CR3 |
|  | CR4 |
|  | CR5 |

TABLE 27-continued

Cyber Resilience Rating Rankings

| Position | Rating |
|---|---|
| Laggards | CR6 |
|  | CR7 |
|  | CR8 |

As described by Table 27, identifiers CR1 to CR8 may be representative of cyber resilience ratings for an entity in order of a highest rating to a lowest rating. The identifiers may correspond to a respective position indicative of where the entity corresponding to the identifier and cyber resilience rating is ranked among other entities with respect to cyber resilience. For example, entities having cyber resilience ratings corresponding to the identifiers CR1 and CR2 may be leaders among entities with respect to cyber resilience, while entities having cyber resilience ratings corresponding to the identifiers CR6, CR7, and CR8 may be laggards among entities with respect to cyber resilience.

In some embodiments, the cyber resilience rating can include the scores of the combined fortitude and governance factors plotted against the score of the risk factor, where a respective cyber resilience rating may be determined for each of a number of scoring methods. In some cases, the cyber resilience rating may be scored using a scoring method based on an EP value and materiality value (e.g., as described with respect to scoring for the risk factor). In some cases, a scoring rubric may use the number of scoring methods to determine applicability of each scoring method to real world assessments. For example, there can be a relationship between the fours factors (risk, threat, fortitude, and governance) described herein, such that the combination of scores for the fortitude and governance factor can be represented as a cyber security score. In some cases, the cyber security score can be plotted against the risk score in an (x, y) pair to determine the cyber resilience rating for the entity.

In some embodiments, a multiplicative scoring method may be used by the cyber resilience assessment module 220 to determine a cyber resilience rating for an entity. For the multiplicative scoring method, the cyber resilience assessment module 220 may multiply the fortitude and governance factor scores to determine a combined score. The cyber resilience assessment module 220 may multiply the combined score by a scaled risk factor score as described by Equation 19.

$$CRx \text{ Score} = \frac{\text{Fortitude Score} + \text{Goverance Score}}{2} * (\text{Risk Score} * 10) \quad (19)$$

The multiplicative scoring method performed by the cyber resilience assessment module 220 may yield approximate cyber resilience scores as described by Table 28.

TABLE 28

Cyber Resilience Rating For Multiplicative Scoring Method

| Combined Fortitude and Governance Scores Minimum | Cyber Resilience Rating | | | | | | | | | |
|---|---|---|---|---|---|---|---|---|---|---|
| 901 | 90 | 180 | 270 | 360 | 451 | 541 | 631 | 721 | 811 | 901 |
| 801 | 80 | 160 | 240 | 320 | 401 | 481 | 561 | 641 | 721 | 801 |
| 701 | 70 | 140 | 210 | 280 | 351 | 421 | 491 | 561 | 631 | 701 |
| 601 | 60 | 120 | 180 | 240 | 301 | 361 | 421 | 481 | 541 | 601 |

TABLE 28-continued

Cyber Resilience Rating For Multiplicative Scoring Method

| Combined Fortitude and Governance Scores Minimum | Cyber Resilience Rating | | | | | | | | | |
|---|---|---|---|---|---|---|---|---|---|---|
| 501 | 50 | 100 | 150 | 200 | 251 | 301 | 351 | 401 | 451 | 501 |
| 401 | 40 | 80 | 120 | 160 | 201 | 241 | 281 | 321 | 361 | 401 |
| 301 | 30 | 60 | 90 | 120 | 151 | 181 | 211 | 241 | 271 | 301 |
| 201 | 20 | 40 | 60 | 80 | 101 | 121 | 141 | 161 | 181 | 201 |
| 101 | 10 | 20 | 30 | 40 | 51 | 61 | 71 | 81 | 91 | 101 |
| 1 | 0 | 0 | 0 | 0 | 1 | 1 | 1 | 1 | 1 | 1 |
|  | 1 | 2 | 3 | 4 | 5 | 6 | 7 | 8 | 9 | 10 |
|  | | | | | Risk Score | | | | | |

The cyber resilience rating ranking scale for the multiplicative scoring method as described in Table 29 may be representative of how often a rated entity is expected to experience material cyber events as compared to other entities.

TABLE 29

Cyber Resilience Rating Rankings for Multiplicative Scoring Method

| Position | Rating | Score Min | Score Max |
|---|---|---|---|
| Leaders | CR1 | 801 | 1000 |
|  | CR2 | 701 | 800 |

TABLE 29-continued

Cyber Resilience Rating Rankings for Multiplicative Scoring Method

| Position | Rating | Score Min | Score Max |
|---|---|---|---|
| Average | CR3 | 601 | 700 |
|  | CR4 | 501 | 600 |
|  | CR5 | 401 | 500 |
| Laggards | CR6 | 301 | 400 |
|  | CR7 | 201 | 300 |
|  | CR8 | 0 | 200 |

In some embodiments, an averaging scoring method may be used by the cyber resilience assessment module 220 to determine a cyber resilience rating for an entity. For the averaging scoring method, the cyber resilience assessment module 220 may multiply the fortitude and governance factor scores to determine a combined score. The cyber resilience assessment module 220 may multiply the combined score by a scaled risk factor score as described by Equation 20.

$$CRx \text{ Score} = \frac{(\text{Fortitude Score} + \text{Goverance Score} + (\text{Risk Score} * 10)) * 100)}{3} \quad (20)$$

The averaging scoring method performed by the cyber resilience assessment module 220 may yield approximate cyber resilience scores as described by Table 30.

TABLE 30

Cyber Resilience Rating For Averaging Scoring Method

| Combined Fortitude and Governance Scores | | Cyber Resilience Rating | | | | | | | | | |
|---|---|---|---|---|---|---|---|---|---|---|---|
| Min | Max | | | | | | | | | | |
| 901 | 1000 | 501 | 551 | 601 | 651 | 701 | 751 | 801 | 851 | 901 | 951 |
| 801 | 900 | 451 | 501 | 551 | 601 | 651 | 701 | 751 | 801 | 851 | 901 |
| 701 | 800 | 401 | 451 | 501 | 551 | 601 | 651 | 701 | 751 | 801 | 851 |
| 601 | 700 | 351 | 401 | 451 | 501 | 551 | 601 | 651 | 701 | 751 | 801 |
| 501 | 600 | 301 | 351 | 401 | 451 | 501 | 551 | 601 | 651 | 701 | 751 |
| 401 | 500 | 251 | 301 | 351 | 401 | 451 | 501 | 551 | 601 | 651 | 701 |
| 301 | 400 | 201 | 251 | 301 | 351 | 401 | 451 | 501 | 551 | 601 | 651 |
| 201 | 300 | 151 | 201 | 251 | 301 | 351 | 401 | 451 | 501 | 551 | 601 |
| 101 | 200 | 101 | 151 | 201 | 251 | 301 | 351 | 401 | 451 | 501 | 551 |
| 1 | 100 | 51 | 101 | 151 | 201 | 251 | 301 | 351 | 401 | 451 | 501 |
|  |  | 1 | 2 | 3 | 4 | 5 | 6 | 7 | 8 | 9 | 10 |
|  |  | | | | | Risk Score | | | | | |

The cyber resilience rating ranking scale for the averaging scoring method as described in Table 31 may be representative of how often a rated entity is expected to experience material cyber events as compared to other entities.

TABLE 31

Cyber Resilience Rating Rankings for Averaging Scoring Method

| Position | Rating | Cyber Resilience Rating Minimum | Cyber Resilience Rating Maximum |
|---|---|---|---|
| Leaders | CR1 | 901 | 1000 |
|  | CR2 | 801 | 900 |

TABLE 31-continued

Cyber Resilience Rating Rankings for Averaging Scoring Method

| Position | Rating | Cyber Resilience Rating Minimum | Cyber Resilience Rating Maximum |
|---|---|---|---|
| Average | CR3 | 701 | 800 |
|  | CR4 | 601 | 700 |
|  | CR5 | 501 | 600 |
| Laggards | CR6 | 401 | 500 |
|  | CR7 | 301 | 400 |
|  | CR8 | 0 | 300 |

In some embodiments, a quadrant scoring method may be used by the cyber resilience assessment module 220 to determine a cyber resilience rating for an entity. For the quadrant scoring method, the cyber resilience assessment module 220 may multiply the fortitude and governance factor scores to determine a combined score. The combined score and the risk factor score may be input to Tables 32 and 33 to determine the cyber resilience rating for an entity.

TABLE 32

Cyber Resilience Rating For Averaging Scoring Method

Combined Fortitude and Governance Scores

| Min | Max | Cyber Resilience Rating | | | |
|---|---|---|---|---|---|
| 901 | 1000 | CR6 | CR5 | CR2 | CR1 |
| 801 | 900 | | | | |
| 701 | 800 | | | | |
| 601 | 700 | CR7 | CR4 | CR3 | CR2 |
| 501 | 600 | | | | |
| 401 | 500 | | CR6 | CR4 | CR5 |
| 301 | 400 | | | | |
| 201 | 300 | CR8 | | CR7 | CR6 |
| 101 | 200 | | | | |
| 1 | 100 | | | | |
| | | 1  2  3  4  5  6  7  8  9  10 | | | |
| | | Risk | | | |

The cyber resilience rating ranking scale for the multiplicate scoring method as described in Table 33 may be representative of how often a rated entity is expected to experience material cyber events as compared to other entities.

TABLE 33

Cyber Resilience Rating Rankings for Quadrant Scoring Method

| Position | Rating | Combined Fortitude and Governance Score | Risk Score |
|---|---|---|---|
| Leaders | CR1 | 701-1000 | 8-10 |
|  | CR2 | 701-1000 | 6-8 |
|  |  | 501-700 | 8-10 |
| Average | CR3 | 501-700 | 6-8 |
|  | CR4 | 501-700 | 4-6 |
|  |  | 301-500 | 6-8 |
|  | CR5 | 701-1000 | 4-6 |
|  |  | 301-500 | 8-10 |
|  |  | 701-1000 | 1-3 |
|  | CR6 | 301-500 | 4-6 |
|  |  | 1-300 | 8-10 |
| Laggards | CR7 | 301-700 | 1-3 |
|  |  | 1-300 | 4-7 |
|  | CR8 | 1-300 | 1-3 |

In some embodiments, a materiality scoring method may be used by the cyber resilience assessment module 220 to determine a cyber resilience rating for an entity. For the quadrant scoring method, the cyber resilience assessment module 220 may determine an intersection of an entity's materiality value with a selected EP curve and may identify and select the EP value corresponding to the intersection. The cyber resilience assessment module 220 may input to the EP value to the scoring methodology described in Table 34 to determine a cyber resilience score.

TABLE 34

Cyber Resilience Rating Rankings For Materiality Scoring Method

| Position | Rating | EP Materiality Intersect Value |
|---|---|---|
| Leaders | CR1 | >0.0% to <0.6% |
|  | CR2 | >0.5% to <1.1% |
| Average | CR3 | >1.0% to <3.1% |
|  | CR4 | >3.0% to <6.1% |
|  | CR5 | >6.0% to <10.1% |
| Laggards | CR6 | >10.0% to <15.1% |
|  | CR7 | >15.0% to <25.1% |
|  | CR8 | >25.0% |

The materiality scoring method can be conducted with an L2, L3, and/or L4 EP curve, individually or in any combination. The materiality scoring method may not be conducted with an L1 EP curve (uncalibrated EP curve) based on the L1 EP curve not including the control strength represented by the fortitude and governance factors.

In some embodiments, cyber security score may be computed out of 1,000 possible points with each rating distributed as described in Table 35:

TABLE 35

Exemplary Ratings for a Cyber Security Score

| Score Range | Expected Industry Performance (80% of entities in these industries are expected to perform in this range) |
|---|---|
| 700-1,000 | Utilities |
|  | Information |
|  | Finance and Insurance |
|  | Health Care and Social Assistance |
| 350-850 | Manufacturing |
|  | Wholesale Trade |
|  | Retail Trade |
|  | Professional, Scientific, and Technical Services |
|  | Management of Companies and Enterprises |
|  | Administrative and Support and Waste Management and Remediation Services |
|  | Educational Services |
|  | Health Care and Social Assistance |
|  | Public Administration |
| 251-400 | Agriculture, Forestry, Fishing and Hunting |
|  | Mining |
|  | Construction |
|  | Transportation and Warehousing |
|  | Real Estate Rental and Leasing |
|  | Arts, Entertainment, and Recreation |
|  | Accommodation and Food Services |
|  | Other Services |
| 0-250 | Cyber Poverty Line |
|  | Entities scored in this range are insufficient to defend against even the most basic cyber attacks |

The cyber security score may be a measure of the approach and actions of an assessed entity associated with the security processes and technology to protect confidentiality, integrity, and availability of the entity's data and assets to a degree commensurate with the level of threat to which the entity is exposed. A cyber security score may be determined based on a sum of the scores for the fortitude and governance factors multiplied by 5, as described by Equation 21.

$$\text{Cyber Security Score} = (\text{Fortitude Score} + \text{Governance Score}) * 5 \quad (21)$$

The approach and actions of an assessed entity may include security governance, policies, technologies, tools, and training that can be used to provide the best-possible protection for the state of the entity's cyber environment and the entity's users.

Exemplary Method for Determining a Cyber Resilience Rating

Figure 3:
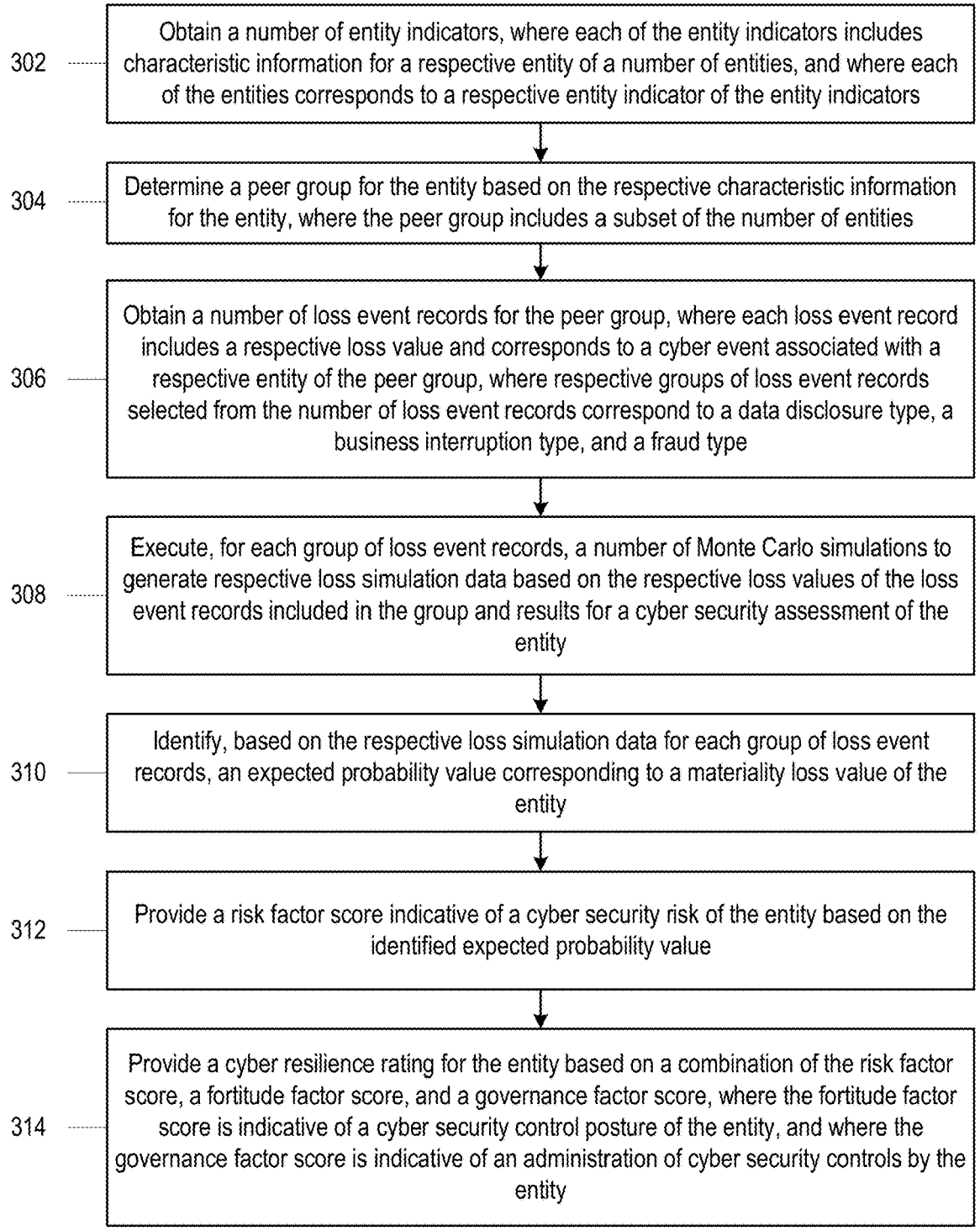
FIG. 3 depicts a flowchart of an exemplary method for providing a cyber resilience rating for an entity, according to some embodiments.

In some embodiments, the cyber resilience assessment tool 200 may provide assessments of an entity's cyber resilience. To assess an entity's cyber resilience, the cyber resilience assessment tool 200 may perform a method to determine a cyber resilience rating indicative of the entity's cyber resilience, where the cyber resilience rating is based on scoring for governance, fortitude, and/or risk factors as described herein. Referring to FIG. 3, a flowchart of an exemplary method 300 for providing a cyber resilience rating for an entity is depicted. The method 300 may be suitable for generating respective scores for governance, fortitude, and risk factors. One of ordinary skill in the art will appreciate that the method 300 may be executed by the cyber resilience rating more than once (e.g., periodically) for a particular entity to evaluate changes in an entity's cyber resilience rating and/or individual scores of factors and/or subfactors included in the entity's cyber resilience rating.

At step 302, the cyber resilience assessment tool 200 may obtain and/or otherwise receive a number of entity indicators corresponding to a number of entities. Each the entity indicators may include characteristic information for a respective entity of the entities. Each of the number of entities may have and/or otherwise correspond to a respective entity indicator of the number of entity indicators, such that the cyber resilience assessment tool 200 receives characteristic information for each of the entities. The characteristic information for a respective entity may include indicators providing information for the entity's industry, geographic location, and/or size as described herein. The entity indicators may be received by one or more computing systems (e.g., external computing systems) that are communicatively connected to the cyber resilience assessment tool 200.

At step 304, the cyber resilience assessment tool 200 may determine one or more peer groups for an entity based on the peer group analysis techniques described herein. In some cases, the cyber resilience assessment tool 200 may determine a peer group for the entity based on the respective characteristic information (e.g., industry, geography, size) of the entity relative to a number of entities, where the peer group includes a subset of the plurality of entities.

At step 306, the cyber resilience assessment tool 200 may obtain a number of loss event records for each of the peer groups. Each loss event record may include a respective loss value and may correspond to a cyber event associated with a respective entity of the peer group. The loss event records corresponding to each peer group may be categorized as corresponding to respective groups of loss event records selected from the number of loss event records. A group of loss event records from the groups of loss event records for each peer group may correspond to a data disclosure type. A group of loss event records from the groups of loss event records for each peer group may correspond to a business interruption type. A group of loss event records from the groups of loss event records for each peer group may correspond to a fraud type. Loss event records may be grouped based on the loss event records corresponding to one of the data disclosure type, business interruption type, or fraud type.

At step 308, the cyber resilience assessment tool 200 may execute a number of Monte Carlo simulations to generate respective loss simulation data for each group of loss event records. Groups of loss event records may correspond to the data disclosure type, business interruption type, and fraud type. A minimum number of loss event records included in a group of loss event records may be required to execute the Monte Carlo simulations. If a group of loss event records for a peer group does not included a minimum number of loss event records, the cyber resilience assessment tool 200 may use the group of event records for a less granular peer group for the entity. The cyber resilience assessment tool 200 may repeatedly attempt to use the group of event records for a less granular peer group of the entity for execution of the Monte Carlo simulations until the number of event records included in the group of event records meets the minimum number of loss event records. The cyber resilience assessment tool 200 may initially attempt to use the group of event records for the most granular peer group of the entity for execution of the Monte Carlo simulations. The Monte Carlo simulations may be executed based on the loss values of the loss event records of the respective group of loss event records. For example, the Monte Carlo simulations may be executed based on statistics aggregated from the loss values of the loss event records of the respective group of loss event records, where the statistics are used to generate beta PERT distributions that are provided as inputs for the Monte Carlo simulations. In some cases, the Monte Carlo simulations may be executed based on inside-out or outside-in assessment results for the entity.

At step 310, the cyber resilience assessment tool 200 may identify, based on the respective loss simulation data for each group of loss event records, an expected probability value corresponding to a materiality loss value of the entity. The materiality loss value for the entity may be based on the entity's revenue and industry as described herein. Based on the materiality loss value, the cyber resilience assessment tool 200 may determining materiality ratios for the simulation loss data corresponding to each group of loss event records (e.g., corresponding to the data disclosure type, business interruption type, and fraud type). The cyber resilience assessment tool 200 may select the loss simulation data of the group of event records corresponding to the high of the determined materiality ratios. The cyber resilience assessment tool 200 may generate one or more EP curves from the selected loss simulation data. The EP curves may any of the type of EP curves described herein based on an availability of assessment results. The cyber resilience assessment tool 200 may select an EP curve having the highest confidence from the generated EP curves and may identify the expected probability value from the selected EP curve that corresponds to the materiality value for the entity.

At step 312, the cyber resilience assessment tool 200 may provide a risk factor score indicative of a cyber security risk of the entity based on the identified expected probability value. The cyber resilience assessment tool 200 may determine the risk factor score based on any of the risk factor scoring techniques described herein that are based on the expected probability value of the entity.

At step 314, the cyber resilience assessment tool 200 may provide a cyber resilience rating for the entity based on a combination of the risk factor score, a fortitude factor score, and a governance factor score. The cyber resilience assessment tool 200 may provide the cyber resilience rating for the entity based on any of the suitable rating techniques described herein. The cyber resilience rating and the scores for the governance, fortitude, and/or risk factors may be made available via a graphical user interface with information indicative of the subfactors contributing each of the scores.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 4:
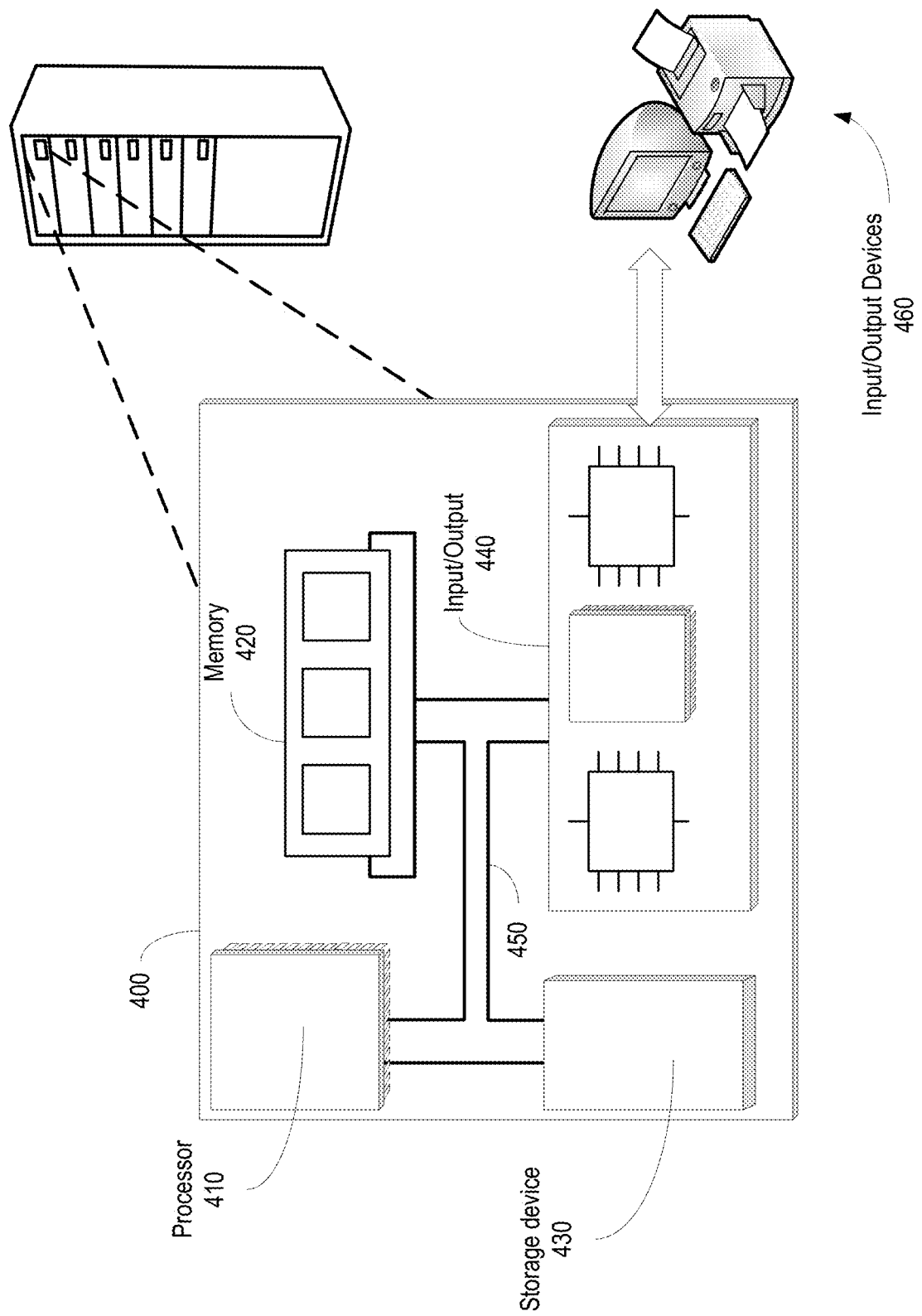
FIG. 4 is a block diagram of an example computer system that may be used in implementing the technology described herein.

FIG. 4 is a block diagram of an example computer system 400 that may be used in implementing the technology described in this document. General-purpose computers, network appliances, mobile devices, or other electronic systems may also include at least portions of the system 400. The system 400 includes a processor 410, a memory 420, a storage device 430, and an input/output device 440. Each of the components 410, 420, 430, and 440 may be interconnected, for example, using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430.

The memory 420 stores information within the system 400. In some implementations, the memory 420 is a non-transitory computer-readable medium. In some implementations, the memory 420 is a volatile memory unit. In some implementations, the memory 420 is a nonvolatile memory unit.

The storage device 430 is capable of providing mass storage for the system 400. In some implementations, the storage device 430 is a non-transitory computer-readable medium. In various different implementations, the storage device 430 may include, for example, a hard disk device, an optical disk device, a solid-date drive, a flash drive, or some other large capacity storage device. For example, the storage device may store long-term data (e.g., database data, file system data, etc.). The input/output device 440 provides input/output operations for the system 400. In some implementations, the input/output device 440 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 430 may be implemented in a distributed way over a network, such as a server farm or a set of widely distributed servers, or may be implemented in a single computing device.

Although an example processing system has been described in FIG. 4, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method for providing a cyber resilience rating for an entity of a plurality of entities, the method comprising:
   obtaining a plurality of entity indicators corresponding to the plurality of entities, wherein each of the plurality of entity indicators comprises characteristic information for a respective entity of the plurality of entities, and wherein each of the plurality of entities corresponds to a respective entity indicator of the plurality of entity indicators;
   determining a peer group for the entity based on the respective characteristic information for the entity, wherein the peer group comprises a subset of the plurality of entities;
   obtaining a plurality of loss event records for the peer group, wherein each loss event record comprises a respective loss value and corresponds to a cyber event associated with a respective entity of the peer group, wherein respective groups of loss event records selected from the plurality of loss event records correspond to a data disclosure type, a business interruption type, and a fraud type;
   executing, for each group of loss event records, a plurality of Monte Carlo simulations to generate respective loss simulation data based on the respective loss values of the loss event records included in the group and results for a cyber security assessment of the entity;
   identifying, based on the respective loss simulation data for each group of loss event records, an expected probability value corresponding to a materiality loss value of the entity;
   providing a risk factor score indicative of a cyber security risk of the entity based on the identified expected probability value; and
   providing a cyber resilience rating for the entity based on a combination of the risk factor score, a fortitude factor score, and a governance factor score, wherein the fortitude factor score is indicative of a cyber security control posture of the entity, and wherein the governance factor score is indicative of an administration of cyber security controls by the entity.

2. The method of claim 1, wherein the characteristic information comprises an industry indicator, a geography indicator, and a size indicator for the respective entity.

3. The method of claim 2, wherein the determining the peer group for the entity based on the respective entity characteristics of the entity further comprises:
   selecting, from the plurality of entities, the subset of the plurality of entities for inclusion in the peer group based on the respective characteristic information corresponding to each entity of the subset of the plurality of entities comprising at least one of: the industry indicator, the geography indicator, and the size indicator corresponding to the entity.

4. The method of claim 1, wherein the peer group comprises a first peer group and a second peer group, wherein the first peer group and the second peer group comprise different subsets of the plurality of entities.

5. The method of claim 1, wherein each loss event record of the plurality of loss event records comprises a respective loss event type corresponding to one of: the data disclosure type, the business interruption type, or the fraud type, and further comprising:

selecting the respective groups of loss event records from the plurality of loss event records based on the respective loss event type of each loss event record included in the respective groups of loss event records.

6. The method of claim 1, wherein the data disclosure type corresponds to at least one of:
a data breach;
a data theft;
a data loss; and
an unintentional data disclosure.

7. The method of claim 1, wherein the business interruption type corresponds to at least one of:
a cyber extortion event;
a network disruption; and
a website disruption.

8. The method of claim 1, wherein the fraud type corresponds to at least one of:
an identity fraud event;
a phishing event; and
a skimming event.

9. The method of claim 1, wherein the executing, for each group of loss event records, the plurality of Monte Carlo simulations to generate the respective loss simulation data further comprises:
determining a statistic from the respective loss values of the loss event records included in the group;
weighting the statistic based on the results for the cyber security assessment of the entity to determine a weighted statistic; and
executing the plurality of Monte Carlo simulations based on the weighted statistic.

10. The method of claim 1, wherein the cyber security assessment comprises an outside-in cyber security assessment or an inside-out cyber security assessment.

11. The method of claim 1, wherein the materiality loss value is based on an industry indicator corresponding to the entity and a revenue corresponding to the entity, and further comprising:
determining a respective materiality ratio for each respective loss simulation data, wherein the each of the respective materiality ratios are based on the materiality loss value corresponding to the entity; and
selecting the respective loss simulation data corresponding to a largest materiality ratio of the materiality ratios.

12. The method of claim 11, wherein the identifying the expected probability value corresponding to the materiality loss value of the entity further comprises:
generating a loss exceedance curve indicative of a probability of loss potential for the entity based on the selected loss simulation data; and
identifying, from the loss exceedance curve, the expected probability value corresponding to the materiality loss value of the entity.

13. The method of claim 1, further comprising:
obtaining signal data indicative of a cyber resilience of the entity;
generating, based on a first subset of the signal data, the fortitude factor score, wherein the first subset of the signal data is indicative of the cyber security control posture of the entity; and
generating, based on a second subset of the signal data, the governance factor score, wherein the second subset of the signal data is indicative of the administration of cyber security controls by the entity.

14. A system for providing a cyber resilience rating for an entity of a plurality of entities, the system comprising:
one or more computing systems programmed to perform operations comprising:
obtaining a plurality of entity indicators corresponding to the plurality of entities, wherein each of the plurality of entity indicators comprises characteristic information for a respective entity of the plurality of entities, and wherein each of the plurality of entities corresponds to a respective entity indicator of the plurality of entity indicators;
determining a peer group for the entity based on the respective characteristic information for the entity, wherein the peer group comprises a subset of the plurality of entities;
obtaining a plurality of loss event records for the peer group, wherein each loss event record comprises a respective loss value and corresponds to a cyber event associated with a respective entity of the peer group, wherein respective groups of loss event records selected from the plurality of loss event records correspond to a data disclosure type, a business interruption type, and a fraud type;
executing, for each group of loss event records, a plurality of Monte Carlo simulations to generate respective loss simulation data based on the respective loss values of the loss event records included in the group and results for a cyber security assessment of the entity;
identifying, based on the respective loss simulation data for each group of loss event records, an expected probability value corresponding to a materiality loss value of the entity;
providing a risk factor score indicative of a cyber security risk of the entity based on the identified expected probability value; and
providing a cyber resilience rating for the entity based on a combination of the risk factor score, a fortitude factor score, and a governance factor score, wherein the fortitude factor score is indicative of a cyber security control posture of the entity, and wherein the governance factor score is indicative of an administration of cyber security controls by the entity.

15. The system of claim 14, wherein the characteristic information comprises an industry indicator, a geography indicator, and a size indicator for the respective entity.

16. The system of claim 15, wherein the determining the peer group for the entity based on the respective entity characteristics of the entity further comprises:
selecting, from the plurality of entities, the subset of the plurality of entities for inclusion in the peer group based on the respective characteristic information corresponding to each entity of the subset of the plurality of entities comprising at least one of: the industry indicator, the geography indicator, and the size indicator corresponding to the entity.

17. The system of claim 14, wherein the peer group comprises a first peer group and a second peer group, wherein the first peer group and the second peer group comprise different subsets of the plurality of entities.

18. The system of claim 14, wherein each loss event record of the plurality of loss event records comprises a respective loss event type corresponding to one of: the data disclosure type, the business interruption type, or the fraud type, and wherein the operations further comprise:
selecting the respective groups of loss event records from the plurality of loss event records based on the respective loss event type of each loss event record included in the respective groups of loss event records.

19. The system of claim 14, wherein the data disclosure type corresponds to at least one of:
   a data breach;
   a data theft;
   a data loss; and
   an unintentional data disclosure.

20. The system of claim 14, wherein the business interruption type corresponds to at least one of:
   a cyber extortion event;
   a network disruption; and
   a website disruption.

* * * * *